United States Patent
Tanizawa et al.

(10) Patent No.: US 9,148,659 B2
(45) Date of Patent: *Sep. 29, 2015

(54) MOVING-PICTURE ENCODING APPARATUS AND MOVING-PICTURE DECODING APPARATUS

(71) Applicant: Kabushiki Kaisha Toshiba, Minato-ku (JP)

(72) Inventors: Akiyuki Tanizawa, Kawasaki (JP); Taichiro Shiodera, Tokyo (JP); Takeshi Chujoh, Kawasaki (JP); Jun Yamaguchi, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,037

(22) Filed: Feb. 21, 2014

(65) Prior Publication Data

US 2014/0169462 A1 Jun. 19, 2014

Related U.S. Application Data

(63) Continuation of application No. 13/716,916, filed on Dec. 17, 2012, which is a continuation of application No. 13/543,237, filed on Jul. 6, 2012, which is a continuation of application No. PCT/JP2010/066547, filed on Sep. 24, 2010.

(30) Foreign Application Priority Data

Jan. 7, 2010 (WO) .................. PCT/JP2010/050087

(51) Int. Cl.
*H04N 19/00* (2014.01)
*H04N 19/103* (2014.01)
(Continued)

(52) U.S. Cl.
CPC ....... *H04N 19/00018* (2013.01); *H04N 19/103* (2014.11); *H04N 19/11* (2014.11);
(Continued)

(58) Field of Classification Search
CPC ............................. H04N 19/12; H04N 19/122
USPC .................................................... 375/240.18
See application file for complete search history.

(56) References Cited

U.S. PATENT DOCUMENTS

| | | | |
|---|---|---|---|
| 2003/0103679 A1 | 6/2003 | Etoh et al. | |
| 2007/0160129 A1 | 7/2007 | Fujisawa et al. | |

(Continued)

FOREIGN PATENT DOCUMENTS

| | | |
|---|---|---|
| CN | 101292536 A | 10/2008 |
| CN | 101622877 A | 1/2010 |

(Continued)

OTHER PUBLICATIONS

Extended European Search Report Issued Apr. 26, 2013 in Patent Application No. 10842114.0.

(Continued)

*Primary Examiner* — Sath V Perungavoor
*Assistant Examiner* — Jeffery Williams
(74) *Attorney, Agent, or Firm* — Oblon, McClelland, Maier & Neustadt, L.L.P.

(57) ABSTRACT

According to one embodiment, an encoding apparatus includes a prediction unit, a classifying unit, a first transformer, a second transformer, an order controller, and an entropy coder. The prediction unit obtains a predictive residual signal to be encoded, by using a mode selected from intra-prediction modes. The first transformer obtains first transformation coefficients by subjecting the signal to an orthogonal transformation by use of a first transformation basis if the selected mode is classified into a mode having a prediction direction. The first transformation basis is preset so that a coefficient density after the orthogonal transformation is higher than a coefficient density.

2 Claims, 22 Drawing Sheets

(51) Int. Cl.
  *H04N 19/159* (2014.01)
  *H04N 19/176* (2014.01)
  *H04N 19/147* (2014.01)
  *H04N 19/122* (2014.01)
  *H04N 19/129* (2014.01)
  *H04N 19/11* (2014.01)
  *H04N 19/12* (2014.01)
  *H04N 19/136* (2014.01)
  *H04N 19/18* (2014.01)
  *H04N 19/61* (2014.01)

(52) U.S. Cl.
  CPC ............ *H04N 19/12* (2014.11); *H04N 19/122* (2014.11); *H04N 19/129* (2014.11); *H04N 19/136* (2014.11); *H04N 19/147* (2014.11); *H04N 19/159* (2014.11); *H04N 19/176* (2014.11); *H04N 19/18* (2014.11); *H04N 19/61* (2014.11)

(56) References Cited

U.S. PATENT DOCUMENTS

| | | | |
|---|---|---|---|
| 2007/0189624 A1 | | 8/2007 | Etoh et al. |
| 2008/0137744 A1 | | 6/2008 | Moriya et al. |
| 2008/0170624 A1 | | 7/2008 | Yamada et al. |
| 2008/0170627 A1 | | 7/2008 | Yamada et al. |
| 2008/0170793 A1 | | 7/2008 | Yamada et al. |
| 2008/0285644 A1* | 11/2008 | Seo et al. ............. 375/240.2 |
| 2008/0310504 A1 | | 12/2008 | Ye et al. |
| 2011/0002386 A1* | 1/2011 | Zhang ............. 375/240.15 |

FOREIGN PATENT DOCUMENTS

| | | |
|---|---|---|
| EP | 1 947 86 | 7/2008 |
| JP | 2002-314428 | 10/2002 |
| JP | 2005-176073 | 6/2005 |
| JP | 2007-184871 | 7/2007 |
| JP | 2009-27541 A | 2/2009 |
| JP | 2009-513056 | 3/2009 |
| JP | 2009-272727 | 11/2009 |
| JP | 5432359 B2 | 3/2014 |
| JP | 5432412 B1 | 3/2014 |
| JP | 5526277 B2 | 6/2014 |
| WO | WO 2007/046644 A1 | 4/2007 |
| WO | WO 2007/115127 A2 | 10/2007 |
| WO | WO 2008/067020 A2 | 6/2008 |
| WO | WO 2008/157268 A2 | 12/2008 |
| WO | WO 2008/157360 A2 | 12/2008 |
| WO | WO 2008/157431 A2 | 12/2008 |
| WO | WO 2009/113276 A1 | 9/2009 |

OTHER PUBLICATIONS

International Search Report mailed Oct. 26, 2010, in PCT/JP2010/066547 filed Sep. 24, 2010 (with English Translation).
International Written Opinion mailed Oct. 26, 2010, in PCT/JP2010/066547 filed Sep. 24, 2010.
Yan Ye et al., "Improved Intra Coding", ITU-Telecommunications Standardization Sector, Study Group 16 Question 6, Video Coding Experts Group (VCEG), VCEG-AG11, 33$^{rd}$ Meeting; Oct. 20, 2007, pp. 1-6.
Marta Karczewicz, "Improved Intra Coding", ITU-Telecommunications Standardization Sector, Study Group 16 Question 6, Video Coding Experts Group (VCEG), VCEG-AF15, 32$^{nd}$ Meeting; Apr. 20-21, 2007, pp. 1-4.
Yan Ye et al., Improved H.264 Intra Coding Based on Bi-Directional Intra Prediction, Directional Transform, and Adaptive Coefficient Scanning, IEEE Trans. ICIP 2008, pp. 2116-2119.
Office Action issued Mar. 26, 2013 in Japanese Patent Application No. 2011-548905 with English language translation.
Japanese Office Action issued May 13, 2014 in Patent Application No. 2014-075667 with English Translation.
Extended European Search Report issued May 16, 2014 in Patent Application No. 14157442.6.
Extended European Search Report issued Jun. 5, 2014 in Patent Application No. 14155277.8.
Kenji Sugiyama, "Practice, Video Signal Processing—Experience by Using C Language -." Corona Publishing Co., Ltd., Mar. 18, 2008, pp. 92-94.
Thomas Wiegand et al., "Overview of the H.264/AVC Video Coding Standard", IEEE Transactions on Circuits and Systems for Video Technology, vol. 13, No. 7, XP-011221093, Jul. 2003, pp. 560-576.
"Text of ISO/IEC 14496 10 Advanced Video Coding 3rd Edition", Joint Video Team (JVT) of ISO/IEC MPEG & ITU-T VCEG (ISO/IEC *JTC1/SC29/WG11* and ITU-T SG16 Q.6), No. N6540, XP-030013383, Oct. 1, 2004, 330 pages.
Office Action issued on Oct. 14, 2014 in the corresponding Japanese Patent Application No. 2014-127648 (with English Translation).
Chinese Office Action issued Jul. 29, 2014, in China Patent Application No. 201080060758.4 (with English translation).
Combined Office Action and Search Report issued on Dec. 3, 2015 in Chinese Patent Application No. 201210575806.4 with English translation.

* cited by examiner

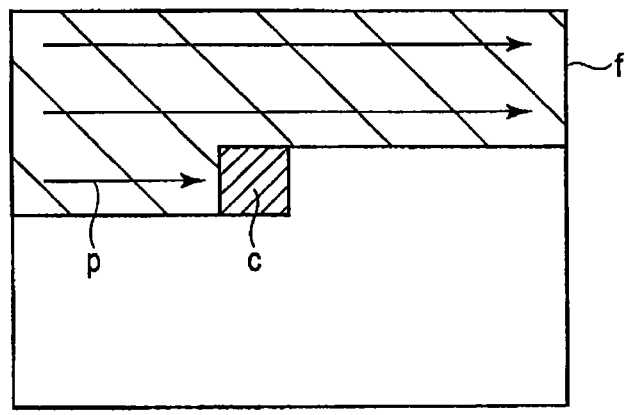
F I G. 2A
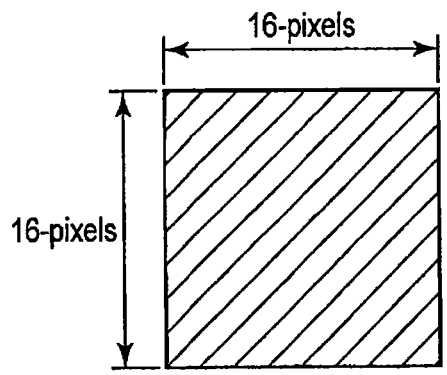
F I G. 2B
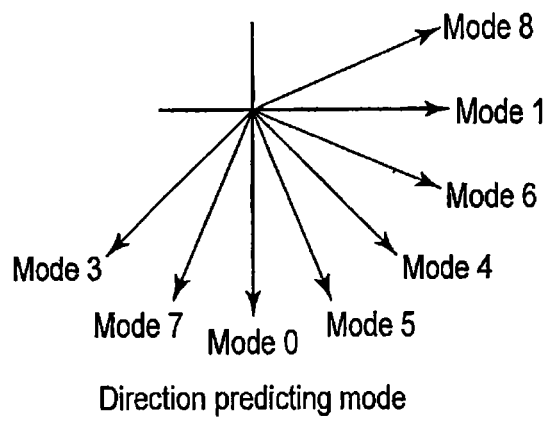
Direction predicting mode
F I G. 3A Arrangement of reference pixels and pixels to be encoded

F I G. 3B

Mode 1 (Horizontal prediction)

F I G. 3C

Mode 4 (Orthogonal right downward prediction)

F I G. 3D

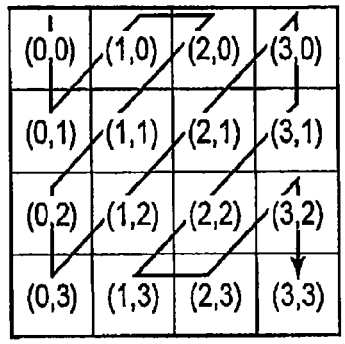
F I G. 4A
| (0,0) | (0,1) | (1,0) | (2,0) | (1,1) | (0,2) | (0,3) | (1,2) | (2,1) | (3,0) | (3,1) | (2,2) | (1,3) | (2,3) | (3,2) | (3,3) |
F I G. 4B
| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| zig-zag | c00 | c01 | c10 | c20 | c11 | c02 | c03 | c12 | c21 | c30 | c31 | c22 | c13 | c23 | c32 | c33 |
F I G. 4C

| IntraNxNPredModeIndex | Name of IntraNxNPredMode | TransformIdx |
|---|---|---|
| 0 | Intra_NxN_Vertical | 0 |
| 1 | Intra_NxN_Horizontal | 0 |
| 2 | Intra_NxN_DC | 1 |
| 3 | Intra_NxN_Diagonal_Down_Left | 0 |
| 4 | Intra_NxN_Diagonal_Down_Right | 0 |
| 5 | Intra_NxN_Vertical_Right | 0 |
| 6 | Intra_NxN_Horizontal_Down | 0 |
| 7 | Intra_NxN_Vertical_Left | 0 |
| 8 | Intra_NxN_Horizontal_Up | 0 |

FIG. 7A

| TransformIdx | Name_of_TransformIdx |
|---|---|
| 0 | First_Diagonal_Transform(First orthogonal transformation) |
| 1 | Second_Diagonal_Transform(Second orthogonal transformation) |

FIG. 7B

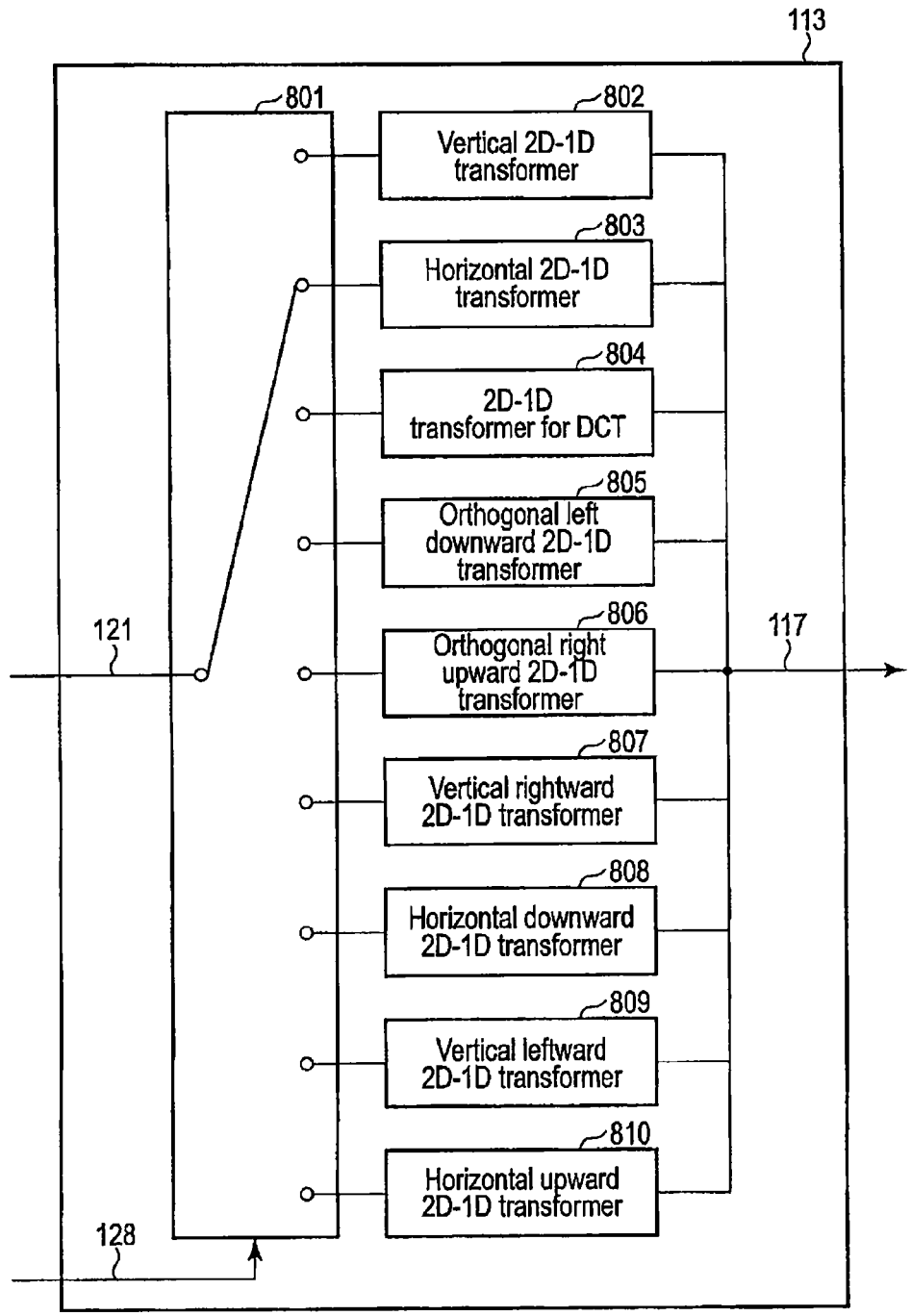
F I G. 8

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Intra_NxN_Vertical | c00 | c10 | c20 | c30 | c01 | c11 | c02 | c12 | c21 | c03 | c22 | c31 | c13 | c32 | c23 | c33 |
| Intra_NxN_Horizontal | c00 | c01 | c02 | c03 | c10 | c11 | c12 | c13 | c20 | c30 | c21 | c22 | c23 | c31 | c32 | c33 |
| Intra_NxN_DC | c00 | c10 | c01 | c11 | c02 | c20 | c12 | c30 | c21 | c03 | c22 | c13 | c23 | c31 | c32 | c33 |
| Intra_NxN_Diagonal_Down_Left | c00 | c10 | c01 | c11 | c02 | c20 | c12 | c03 | c22 | c03 | c13 | c30 | c23 | c31 | c32 | c33 |
| Intra_NxN_Diagonal_Down_Right | c00 | c10 | c01 | c11 | c11 | c21 | c21 | c12 | c22 | c03 | c13 | c30 | c23 | c31 | c32 | c33 |
| Intra_NxN_Vertical_Right | c00 | c10 | c20 | c01 | c11 | c12 | c02 | c03 | c30 | c31 | c22 | c03 | c13 | c23 | c32 | c33 |
| Intra_NxN_Horizontal_Down | c00 | c01 | c02 | c10 | c11 | c21 | c13 | c12 | c22 | c23 | c21 | c20 | c30 | c32 | c31 | c33 |
| Intra_NxN_Vertical_Left | c00 | c10 | c20 | c11 | c01 | c03 | c10 | c13 | c22 | c23 | c02 | c23 | c13 | c03 | c32 | c33 |
| Intra_NxN_Horizontal_Up | c00 | c01 | c02 | c11 | c12 | c03 | c10 | c13 | c22 | c23 | c21 | c20 | c31 | c30 | c32 | c33 |

FIG. 9

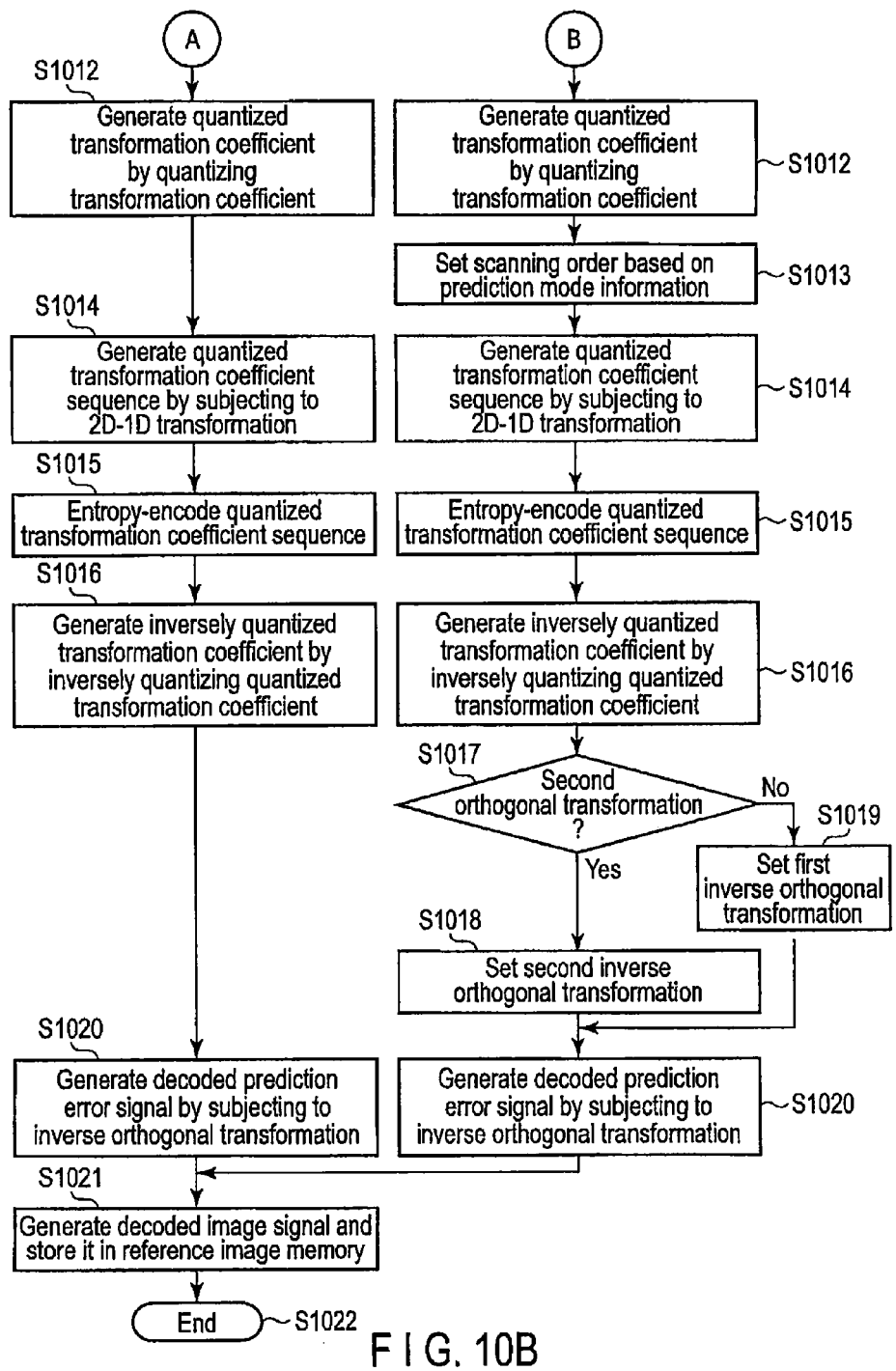
F I G. 10B

```
slice_header( ) {
...
    slice_uni_directional_transform_flag
...
}
```

```
macroblock_layer( ) {
...
  mb_type
...
  if(slice_uni_directional_transform_flag&&mb_type==I_NxN) {
    mb_uni_directional_transform_flag
  }
...
}
```
F I G. 13
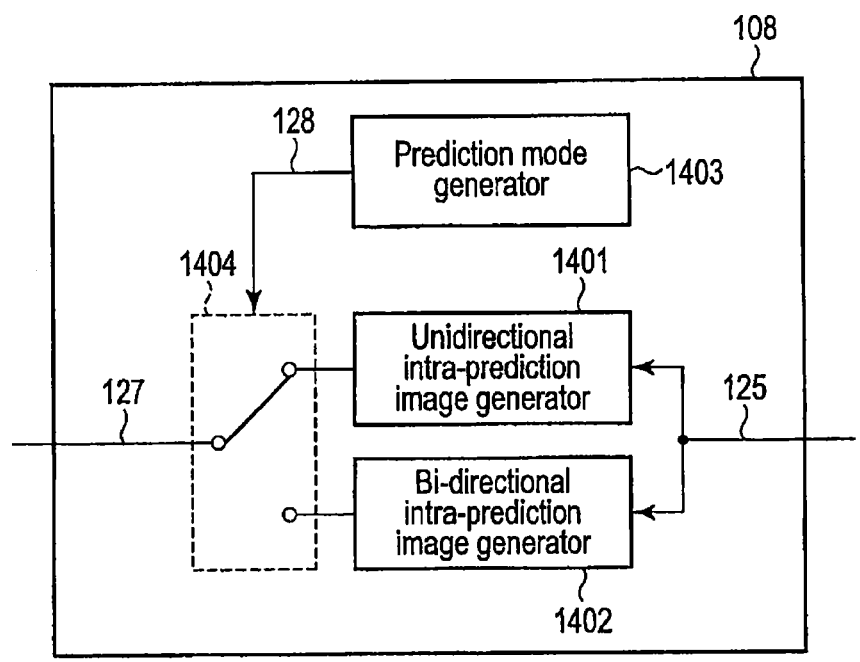
F I G. 14

| bipred_intra_flag | IntraNxNBi-PredModeIndex | IntraNxNPred-ModeIndexL0 | IntraNxNPred-ModeIndexL1 | TransformIdx |
|---|---|---|---|---|
| 0 | 0 | 0 | NA | 0 |
| 0 | 1 | 1 | NA | 0 |
| 0 | 2 | 2 | NA | 1 |
| 0 | 3 | 3 | NA | 0 |
| 0 | 4 | 4 | NA | 0 |
| 0 | 5 | 5 | NA | 0 |
| 0 | 6 | 6 | NA | 0 |
| 0 | 7 | 7 | NA | 0 |
| 0 | 8 | 8 | NA | 0 |
| 1 | 0 | 0 | 1 | 0 |
| 1 | 1 | 0 | 2 | 0 |
| 1 | 2 | 1 | 2 | 0 |
| 1 | 3 | 0 | 3 | 0 |
| 1 | 4 | 1 | 3 | 0 |
| 1 | 5 | 2 | 3 | 1 |
| 1 | 6 | 0 | 4 | 0 |
| 1 | 7 | 1 | 4 | 0 |
| 1 | 8 | 2 | 4 | 1 |
| 1 | 9 | 3 | 4 | 0 |
| 1 | 10 | 0 | 5 | 0 |
| 1 | 11 | 1 | 5 | 0 |
| 1 | 12 | 2 | 5 | 1 |
| 1 | 13 | 3 | 5 | 0 |
| 1 | 14 | 4 | 5 | 0 |
| 1 | 15 | 0 | 6 | 0 |
| 1 | 16 | 1 | 6 | 0 |
| 1 | 17 | 2 | 6 | 1 |

FIG. 15

```
slice_header() {
  ...
  slice_uni_directional_transform_flag
  slice_bipred_intra_flag
  ...
}
```

F I G. 16

```
macroblock_layer() {
  ...
  mb_type
  ...
  if(slice_uni_directional_transform_flag&&mb_type==I_NxN) {
    mb_uni_directional_transform_flag
  }
  ...
  if(slice_bipred_intra_flag&&mb_type==I_NxN) {
    bipred_intra_flag
  }
  ...
}
```

F I G. 17

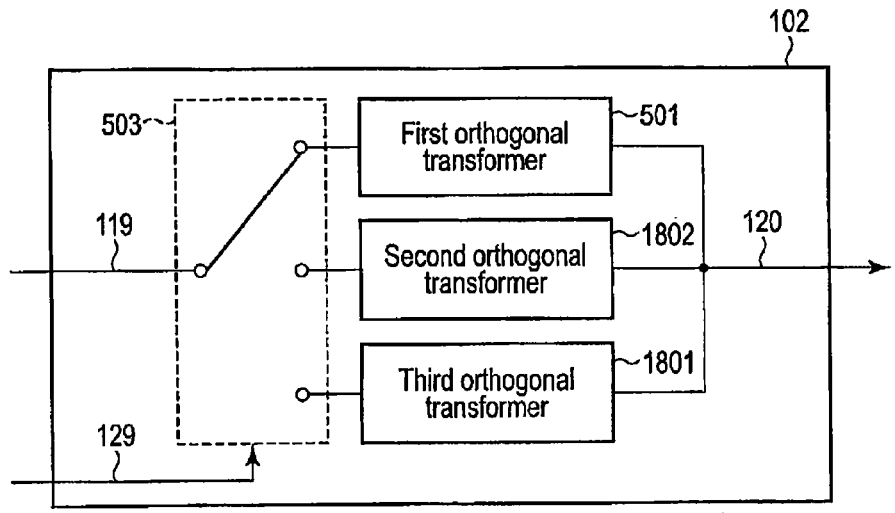
F I G. 18
| IntraNxNPredModeIndex | Name of IntraNxNPredMode | TransformIdx |
|---|---|---|
| 0 | Intra_NxN_Vertical | 0 |
| 1 | Intra_NxN_Horizontal | 1 |
| 2 | Intra_NxN_DC | 2 |
| 3 | Intra_NxN_Diagonal_Down_Left | 2 |
| 4 | Intra_NxN_Diagonal_Down_Right | 2 |
| 5 | Intra_NxN_Vertical_Right | 1 |
| 6 | Intra_NxN_Horizontal_Down | 0 |
| 7 | Intra_NxN_Vertical_Left | 1 |
| 8 | Intra_NxN_Horizontal_Up | 0 |
F I G. 19A

| TransformIdx | Name_of_TransformIdx |
|---|---|
| 0 | First_Diagonal_Transform(First orthogonal transformation) |
| 1 | Second_Diagonal_Transform(Second orthogonal transformation) |
| 2 | Third_Diagonal_Transform(Third orthogonal transformation) |
F I G. 19B
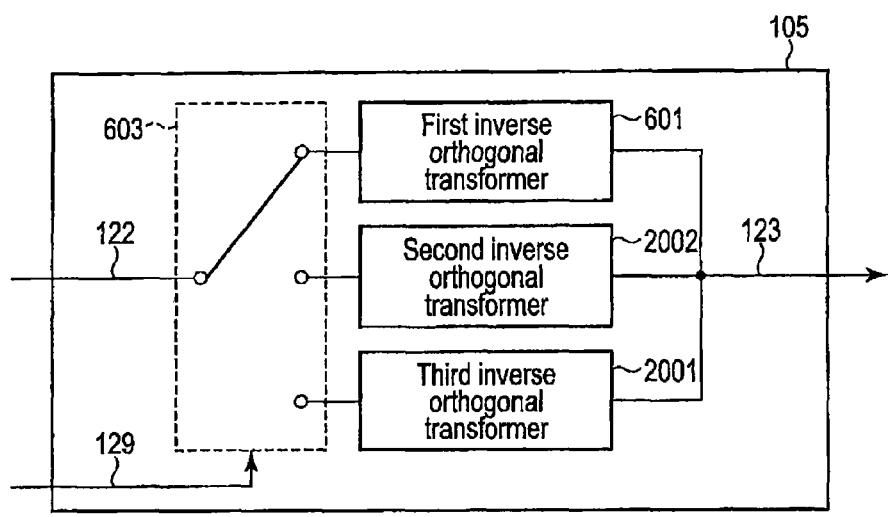
F I G. 20

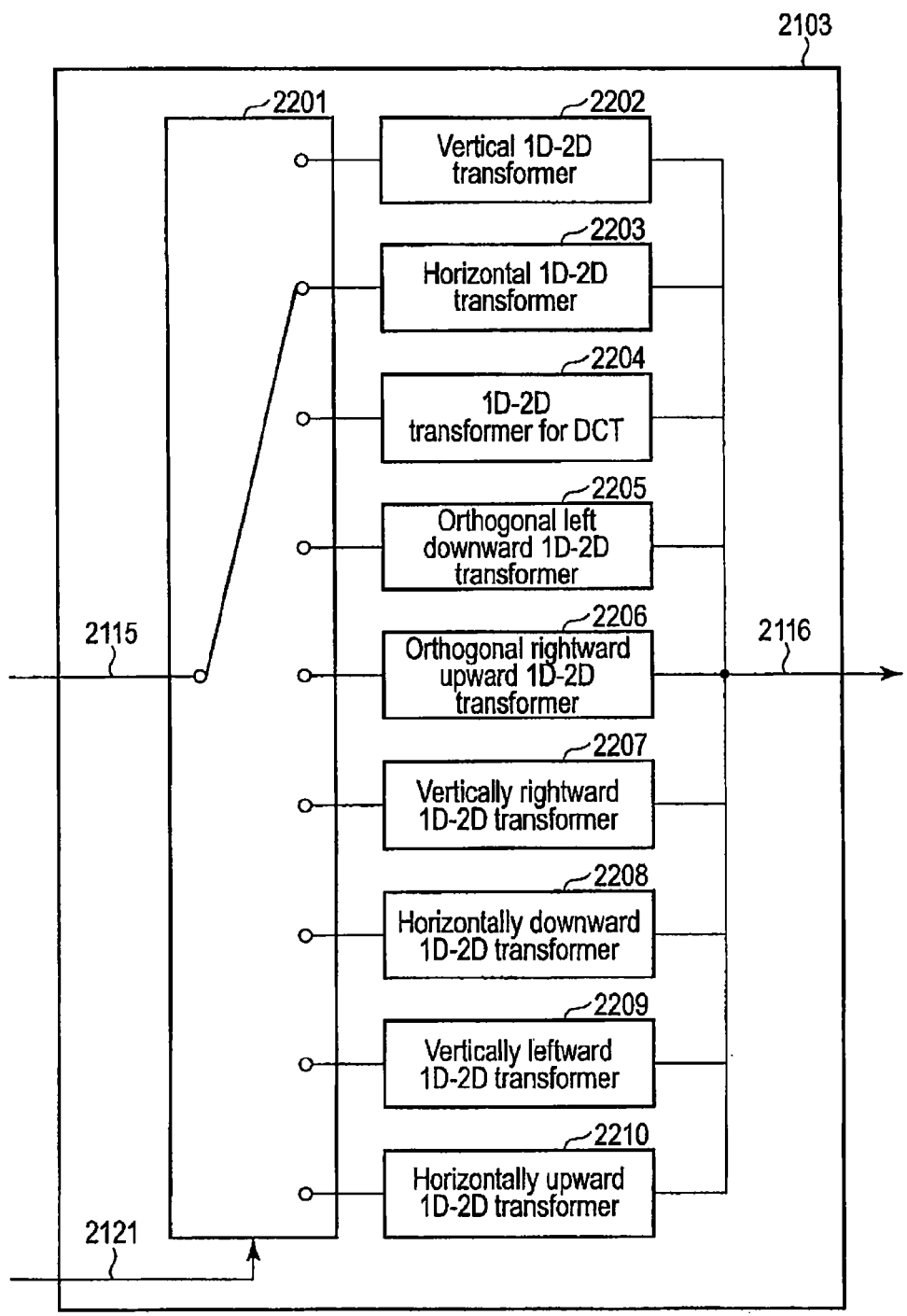
F I G. 22

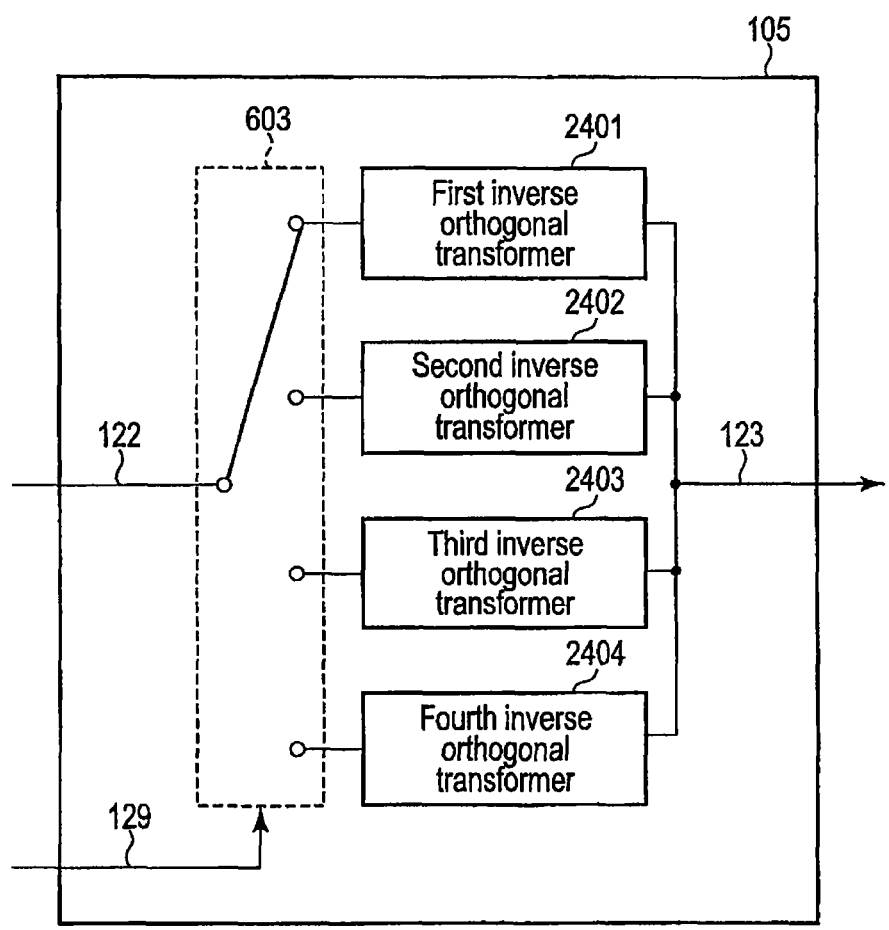
F I G. 24

| IntraNxNPredModeIndex | Name of IntraNxNPredMode | TransformIdx |
|---|---|---|
| 0 | Intra_NxN_Vertical | 1 |
| 1 | Intra_NxN_Horizontal | 2 |
| 2 | Intra_NxN_DC | 3 |
| 3 | Intra_NxN_Diagonal_Down_Left | 1 |
| 4 | Intra_NxN_Diagonal_Down_Right | 0 |
| 5 | Intra_NxN_Vertical_Right | 0 |
| 6 | Intra_NxN_Horizontal_Down | 0 |
| 7 | Intra_NxN_Vertical_Left | 1 |
| 8 | Intra_NxN_Horizontal_Up | 2 |

FIG. 25A

| TransformIdx | Name_of_TransformIdx |
|---|---|
| 0 | First_Diagonal_Transform(First orthogonal transformation) |
| 1 | Second_Diagonal_Transform(Second orthogonal transformation) |
| 2 | Third_Diagonal_Transform(Third orthogonal transformation) |
| 3 | Forth_Diagonal_Transform(Fourth orthogonal transformation) |

FIG. 25B

| TransformIdx | VerticalTransIdx | HorizontalTransIdx |
|---|---|---|
| 0 | 0 | 0 |
| 1 | 0 | 1 |
| 2 | 1 | 0 |
| 3 | 1 | 1 |

FIG. 26A

| VerticalTransIdx | Name_of_VerticalTransIdx |
|---|---|
| 0 | 1D_Transform_Matrix_$\alpha$ |
| 1 | 1D_Transform_Matrix_$\beta$ |

FIG. 26B

| HorizontalTransIdx | Name_of_HorizontalTransIdx |
|---|---|
| 0 | 1D_Transform_Matrix_$\alpha$ |
| 1 | 1D_Transform_Matrix_$\beta$ |

FIG. 26C

MOVING-PICTURE ENCODING APPARATUS AND MOVING-PICTURE DECODING APPARATUS

CROSS-REFERENCE TO RELATED APPLICATIONS

This application is a Continuation Application of U.S. application Ser. No. 13/716,916, filed Dec. 17, 2012, which claims the benefit of priority under 35 U.S.C. §120 to application Ser. No. 13/543,237, filed on Jul. 6, 2012, which is a Continuation Application of PCT Application No. PCT/JP2010/066547, filed Sep. 24, 2010 and based upon and claiming the benefit of priority from prior International Application No. PCT/JP2010/050087, filed Jan. 7, 2010. The entire contents of each of the above are incorporated herein by reference.

FIELD

Embodiments described herein relate generally to a moving picture encoding apparatus and a moving-picture decoding apparatus.

BACKGROUND

In recent years, a moving-picture coding method in which encoding efficiency is greatly improved has been recommended as ITU-T REC. H.264 and ISO/IEC 14496-10 (hereinafter referred to as "H.264") jointly with ITU-T and ISO/IEC. H.264 does not rely on a prediction processing method but performs the processes of an orthogonal transformation and an inverse orthogonal transformation using a discrete cosine transformation.

For instance, WO 2008/157431 and M. Karczewicz, "Improved intra coding", ITU-T SG16/Q.6, VCEG Document, VCEG-AF15, April 2007 disclose a method for improving encoding efficiency by expanding an orthogonal transformation and an inverse orthogonal transformation in H.264, by providing each of the nine types of prediction direction determined as intra-prediction modes with a transformation basis designed to increase coefficient density after an orthogonal transformation of a generated predictive residual, and by performing an orthogonal transformation and an inverse orthogonal transformation.

However, the methods described in WO 2008/157431 and M. Karczewicz, "Improved intra coding", ITU-T SG16/Q.6, VCEG Document, VCEG-AF15, April 2007 mentioned above require an orthogonal transformation processes differing according to each intra-predation mode. To realize the methods by using hardware, eight types of configuration of hardware dedicated for orthogonal and an inverse orthogonal transformation are required, in addition to hardware dedicated to a discrete cosine transformation and an inverse discrete cosine transformation as required in H.264. As a result, circuit scale increases.

BRIEF DESCRIPTION OF THE DRAWINGS

FIG. 2A is a diagram showing a pixel block to be encoded or decoded and the direction of prediction process.

FIG. 2B is a diagram showing a 16×16-pixel block indicating a processing block unit to be encoded or decoded.

FIG. 3A is a diagram showing prediction modes and prediction directions for intra prediction.

FIG. 3B is a diagram showing the arrangement of a reference pixel and pixels to be encoded or decoded.

FIG. 3C is a diagram showing an example of horizontal prediction.

FIG. 3D is a diagram showing an example of vertical prediction.

FIG. 4A is a diagram showing the position of 2D data and scanning order in a 2D-1D transformation using zigzag scanning in a coefficient order controller.

FIG. 4B is a diagram showing 1D data in a 2D-1D transformation using the zigzag scanning in the coefficient order controller.

FIG. 4C is a diagram in which the zigzag scanning in the coefficient order controller is shown using two types of index.

FIG. 7A is a diagram showing correspondence between intra-prediction modes and orthogonal transformation numbers.

FIG. 7B is a diagram explaining an orthogonal transformation numbers and names.

FIG. 8 is a block diagram of a coefficient order controller.

FIG. 9 is a diagram in which scanning orders differing according to each intra-prediction direction in the coefficient order controller is shown using two type of index.

FIG. 10B is a flowchart continued from the flowchart in FIG. 10A.

FIG. 13 is a diagram showing information included in macroblock layer syntax according to the first to eighth embodiments.

FIG. 14 is a block diagram of an intra-prediction image generator according to the second and sixth embodiments.

FIG. 15 is a diagram showing the relation between the bi-directional intra-prediction, unidirectional prediction mode number, and transformation number, according to the second and sixth embodiments.

FIG. 16 is a diagram showing information included in slice header syntax according to the second and sixth embodiments.

FIG. 17 is a diagram showing information included in macroblock layer syntax according to the second and sixth embodiments.

FIG. 18 is a block diagram of an orthogonal transformer according to the third embodiment.

FIG. 19A is a diagram showing the relation between the prediction mode number and transformation number according to the third and seventh embodiments.

FIG. 19B is a diagram showing the transformation numbers and names according the third and seventh embodiments.

FIG. 20 is a block diagram for an inverse orthogonal transformation according to the third and seventh embodiments.

FIG. 22 is a block diagram of a coefficient order controller according to the fifth to eighth embodiments.

FIG. 24 is a block diagram of an inverse orthogonal transformer according to the fourth and eighth embodiments.

FIG. 25A is a diagram showing the relation between the prediction mode number and the transformation number according to the fourth and eighth embodiments.

FIG. 25B is a diagram showing the transformation numbers and names according the fourth and eighth embodiments.

FIG. 26A is a diagram showing one dimensional transformation numbers and two dimensional transformation numbers according to the fourth and eighth embodiments.

FIG. 26B is a diagram showing vertical one dimensional transformation numbers and the name of matrices according to the fourth and eighth embodiments.

FIG. 26C is a diagram showing horizontal one dimensional transformation numbers and the name of matrices according to the fourth and eighth embodiments.

DETAILED DESCRIPTION

A moving-picture encoding apparatus and moving-picture decoding apparatus according to embodiments will be described in detail below with reference to the accompanying drawings. In the description below, parts labeled with the same reference sign perform the same operations, and duplicate explanations are omitted.

An object of the embodiment is to provide a moving-picture encoding apparatus and a moving-picture decoding apparatus that increase coefficient density after an orthogonal transformation and that reduce circuit scale in realization of hardware for an orthogonal transformation and an inverse orthogonal transformation.

In general, according to one embodiment, a moving-picture encoding apparatus includes a prediction unit, a classifying unit, a first orthogonal transformer, a second orthogonal transformer, an order controller, and an entropy coder. A prediction unit obtains a predictive residual signal to be encoded, by using an intra-prediction that corresponds to a mode selected from a plurality of intra-prediction modes. A classifying unit classifies the selected mode into a first prediction mode indicating an intra-prediction using a prediction direction or a second prediction mode indicating an intra-prediction using no prediction direction. A first orthogonal transformer obtains a plurality of first transformation coefficients by subjecting the predictive residual signal to an orthogonal transformation by use of a first transformation basis if the selected mode is classified as the first prediction mode. The first transformation basis is preset so that a first coefficient density after the orthogonal transformation is higher than a second coefficient density. A second orthogonal transformer obtains a plurality of second transformation coefficients by subjecting the predictive residual signal to the orthogonal transformation if the selected mode is classified into the second prediction mode. An order controller rearranges the obtained one of the first transformation coefficients and the second transformation coefficients according to scanning order. An entropy coder encodes the rearranged transformation coefficients and information indicating the selected mode.

Now, first to eighth embodiments will be described with reference to the drawings. The first, second, third, and fourth embodiments are for a moving-picture encoding apparatus and the fifth, sixth, seventh, and eighth embodiments are for a moving-picture decoding apparatus.

The moving-picture encoding apparatus described below divides each frame composing an input image signal into a plurality of pixel blocks, subjects each of these separate pixel blocks to an encoding process, thereby compression-encoding it, and then outputs a sequence of symbols.

First, the first to fourth embodiments relating to the moving-picture encoding apparatus will be described.

First Embodiment

Figure 1:
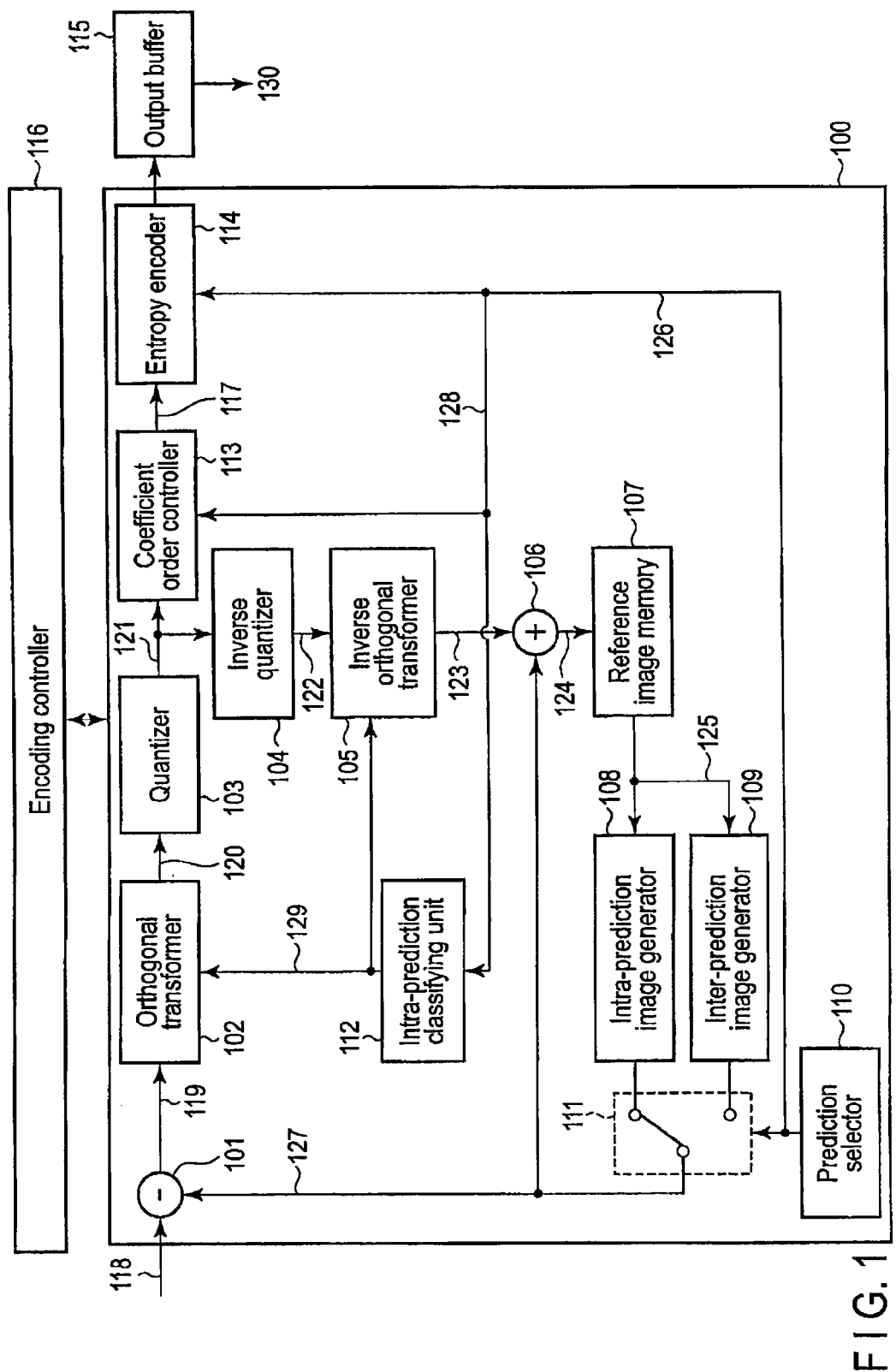
FIG. 1 is a block diagram of moving-picture encoding apparatuses according to first, second and third embodiments.

Referring to FIG. 1, a moving-picture encoding apparatus 100 realizing an encoding method using this embodiment will be described.

Based on an encoding parameter input from an encoding controller 116, the moving-picture encoding apparatus 100 shown in FIG. 1 performs an intra-prediction (prediction within a picture or frame) or inter-prediction (prediction between pictures or frames) encoding process, thereby generating a prediction image signal 127. Subsequently, this encoding apparatus 100 subjects a differential signal between an input image signal 118 and the prediction image signal 127 to an orthogonal transformation and quantization, subjects the result to entropy encoding, and outputs coded data 130.

The moving-picture encoding apparatus 100 divides the input image signal 118 of a moving or still picture into pixel block units, for example macroblock units, and inputs them. The input image signal 118 is an encoding process unit that includes both a frame and a field. In the present embodiment, a description is given of an example where a frame is used as an encoding process unit.

The moving-picture encoding apparatus 100 performs an encoding that uses a plurality of prediction modes different in block size and in method to generate the prediction image signal 127. Specifically, the method of generating the prediction image signal 127 is roughly classified into two categories: intra-prediction (frame intra-prediction or picture intra-prediction) for generating a prediction image only within a frame to be encoded; and an inter-prediction (inter-frame prediction or inter-picture prediction) for predicting using a plurality of reference frames differing in time. A detailed description of the present embodiment is given using an example where a prediction image signal is generated using intra-prediction.

In the first to fourth embodiments, it is assumed for ease of explanation that an encoding process is performed from the upper left side toward the lower right side, as shown in FIG. 2A. In FIG. 2A, in a coded frame f being encoded, blocks located on the left of and above a block c to be encoded are blocks p already encoded.

In the first to fourth embodiments, it is assumed that a macroblock is a basic processing block size for the encoding process. For example, a macroblock is typically a 16×16-pixel block, shown in FIG. 2B. However, a macroblock may be a 32×32- or 8×8-pixel block. Additionally, the shape of a macroblock does not have to be a square grid. In the description below, a block to be encoded or macroblock of the input image signal 118 will simply be called "a prediction target block."

The moving-picture encoding apparatus 100 includes a subtractor 101, an orthogonal transformer 102, a quantizer 103, an inverse quantizer 104, an inverse orthogonal transformer 105, an adder 106, a reference image memory 107, an intra-prediction image generator 108, an inter-prediction image generator 109, a prediction selector 110, a prediction-selecting switch 111, an intra-prediction classifying unit 112, a coefficient order controller 113, and an entropy coder 114. The moving-picture encoding apparatus 100 is connected to an encoding controller 116.

Next, the encoding flow in the moving-picture encoding apparatus 100 will be described.

First, the input image signal 118 is input to the subtractor 101. Further, the prediction image signal 127 corresponding to each prediction mode output from the prediction-selecting switch 111 is input to the subtractor 101. The subtractor 101 calculates a predictive residual signal 119 by subtracting the prediction image signal 127 from the input image signal 118. The predictive residual signal 119 is input to the orthogonal transformer 102.

The orthogonal transformer 102 has the function of subjecting the predictive residual signal 119 to, for example, a discrete cosine transformation (DCT). Then, this transformer 102 performs an orthogonal transformation according to transformation basis selection information 129 input from the intra-prediction classifying unit 112 and generates transformation coefficients 120. The transformation coefficients 120 thus generated are input to the quantizer 103. In this description, DCT is used. However, other forms of an orthogonal transformation such as an Hadamard transformation, a Karhunen-Loeve transformation (described below), or a discrete sine transformation, may be used. The quantizer 103 quantizes the transformation coefficients 120 according to a quantization parameter that indicates fineness of quantization, which is given by the encoding controller 116, and also according to quantization information represented by, for example, a quantization matrix that weights fineness of quantization for each component of the transformation coefficients. The quantizer 103 outputs quantized transformation coefficients 121 to the coefficient order controller 113, and also outputs it to the inverse quantizer 104.

The coefficient order controller 113 has the function of transforming the two dimensional data of the quantized transformation coefficients 121 into one dimensional data based on prediction modes 128 contained in the prediction information 126 output from the prediction selector 110. An example of a representative scanning order is, for example, zigzag scanning. The quantized transformation coefficients 121 are transformed into the one dimensional data already changed into a quantized transformation coefficients sequence 117, which is input to the entropy coder 114.

The entropy coder 114 subjects the quantized transformation coefficient sequence 117 to entropy encoding such as Huffman encoding or arithmetic encoding. The entropy coder 114 also subjects to entropy encoding the prediction information 126 output from the prediction selector 110, the quantization information output from the encoding controller 116, and various encoding parameters used to encode a target block. Thus, coded data 130 is generated.

The encoding parameters are parameters required to decode prediction information, information about transformation coefficients, information about quantization, and so on. The encoding parameters for each prediction target block are held in the internal memory (not shown) of the encoding controller 116, and are used when the prediction target block is used as a block adjacent to another pixel block.

The coded data 130 generated by the entropy coder 114 is output from the moving-picture encoding apparatus 100, then subjected to multiplexing and so on, temporarily held in an output buffer 115, and subsequently output as coded data 130 according to an appropriate output timing managed by the encoding controller 116. The coded data 130 is transmitted to, for example, a storage system (storage medium) or transmission system (communication line), not shown.

The inverse quantizer 104 subjects the quantized transformation coefficients 121 output from the quantizer 103 to inverse quantization. In this case, quantization information used in the quantizer 103 is loaded from the internal memory of the encoding controller 116 and subjected to an inverse quantization process. Examples of quantization information include the quantization parameter described above, and a parameter represented by the quantization matrix or the like described above. The quantized transformation coefficients 121 subjected to the inverse quantization process have been changed into inversely quantized transformation coefficients 122 and input to the inverse orthogonal transformer 105.

The inverse orthogonal transformer 105 subjects the inverse quantized transformation coefficients 122 to an inverse orthogonal transformation according to transformation base selection information 129 input from the intra-prediction classifying unit 112, and thereby reproduces a restored predictive residual signal 123. For example, where DCT has been performed in the orthogonal transformer 102, the inverse orthogonal transformer 105 performs an inverse orthogonal transformation such as an inverse discrete cosine transformation (IDCT). In this description, an example is given using IDCT. However, where the orthogonal transformer 102 uses another form of an orthogonal transformation such as an Hadamard transformation, a Karhunen-Loeve transformation (described below), or a discrete sine transformation, an inverse transformation is performed using their orthogonal transformation bases.

The restored predictive residual signal 123 is input to the adder 106. In this adder 106, the restored predictive residual signal 123 and the prediction image signal 127 output from the prediction-selecting switch 111 are added to thereby generate a decoded image signal 124. The decoded image signal 124 is a partially decoded image signal. The decoded image signal 124 is stored in the reference image memory 107 as a reference image signal 125. The reference image signal 125 stored in the reference image memory 107 is output to the intra-prediction image generator 108, the inter-prediction image generator 109, etc., and is referred to for prediction.

The reference image signal 125 stored in the reference image memory 107 is output to the intra-prediction image generator 108. The intra-prediction image generator 108 has the function of performing intra-prediction using the input reference image signal 125. For example, in H.264, using a reference pixel value that is located adjacent to a prediction target block and that has already been decoded, a pixel is compensated for according to the direction of prediction such as vertical or horizontal, thereby generating a prediction image. FIG. 3A shows the direction of prediction for intra-prediction in H.264. Additionally, FIG. 3B shows the arrangement of reference pixels and pixels to be encoded, in H.264. Further, FIGS. 3C and 3D show examples of horizontal prediction and orthogonal right downward prediction. Further, FIGS. 7A and 7B show the relation between the prediction modes and corresponding prediction names in H.264. Incidentally, after a pixel value is interpolated using a predetermined interpolating method, the interpolated pixel value may be copied in a predetermined direction of prediction.

The inter-prediction image generator 109 performs a block matching process based on the prediction target block and the reference image signal 125, thereby calculating the amount of difference in motion (motion vector), and performs an interpolation based on this motion vector, thereby generating a prediction image signal. In H.264, an interpolation image process of up to ¼-pixel precision is possible. The motion vector thus calculated is entropy-encoded for use as prediction information 126.

The prediction-selecting switch 111 has the function of selecting the output terminal of the intra-prediction image generator 108 or the output terminal of the inter-prediction image generator 109 according to the prediction information 126. If information indicated by the prediction information 126 is intra-prediction, the switch is connected to the intra-prediction image generator 108. Conversely, if the prediction information 126 is inter-prediction, the switch is connected to the inter-prediction image generator 109. An example of the prediction information 126 is described below.

The generated prediction image signal 127 is output to the prediction-selecting switch 111. In addition, the prediction modes 128 used for the generation of the prediction image signal 127 are controlled by the encoding controller 116. For example, when intra-prediction is performed in the intra-prediction image generator 108, the prediction modes 128 are supplied to the intra-prediction image generator 108 from the encoding controller 116, and the prediction image signal 127 is generated according to this value. For example, the encoding controller 116 performs intra-prediction in ascending order from the smallest number of the prediction mode 128 or in descending order from the largest one. Alternatively, the prediction modes may be limited according to the characteristics of an input image. Additionally, it is not necessary to generate the prediction image signals 127 for all the prediction modes. Instead, the prediction modes may be limited according to the characteristics of an input image or at least a prediction image signal 127 may be generated for a block to be encoded.

The prediction selector 110 has the function of setting prediction information 126 according to prediction modes controlled by the encoding controller 116. Intra-prediction or inter-prediction is selectable as prediction mode, and a plurality of modes may be provided for each prediction. Specifically, in the prediction mode determination, prediction information 126 (or prediction mode 128) is determined using the cost represented by the equation given below. If the number of symbols (e.g., the number of symbols representing a motion vector or the number of symbols representing a prediction block size) relating to the prediction information 126 required to select this prediction mode 128 is represented by OH, and the sum of the absolute difference between the input image signal 118 and the prediction image signal 127 (which indicates the absolute cumulative sum of the predictive residual signals 119) is represented by SAD, the following determination equation is used.

$$K = SAD + \lambda \times OH \quad (1)$$

In the equation, K and λ represent cost and constant respectively. The sign λ is a Lagrange undetermined multiplier determined based on the value of the quantization parameter. In the determination equation, the mode in which the cost K results in the smallest value is selected as the optimum prediction mode.

Instead of the equation (1), the prediction information 126 may be determined using: (a) only prediction information; or (b) only SAD. Alternatively, a value obtained by subjecting (b) to an Hadamard transformation for example, or a value approximate to it, may be used.

Further, as another example, a temporary encoder may be provided, and the prediction information 126 may be determined using the number of symbols when the predictive residual signal 119 generated in a certain prediction mode by the temporary encoder is actually encoded, together with the square of the difference between the input image signal 118 and the decoded image signal 124. The determination equation in this case is as follows.

$$J = D + \lambda \times R \quad (2)$$

In the equation, J represents encoding cost, D represents encoding deformation indicating the square of the difference between the input image signal 118 and the decoded image signal 124. On the other hand, R represents the number of symbols estimated by temporary encoding.

As the use of encoding cost J represented by equation (2) requires temporary encoding and partial decoding process for each prediction mode, the scale of a circuit or the amount of calculation increases. On the other hand, as a more accurate number of symbols and encoding deformation are used, high encoding efficiency can be maintained. Instead of equation (2), the cost can be calculated using only R or only D. Alternatively, a cost function may be formed using a value approximate to R or D.

The intra-prediction classifying unit 112 has the function of generating transformation basis selection information 129 used in an orthogonal transformation based on input prediction modes 128.

Above is the outline of the moving-picture encoding apparatus 100 according to the present embodiment. Next, the orthogonal transformer 102 and the inverse orthogonal transformer 105 are described in detail with reference to FIGS. 5 and 6. Also, the intra-prediction classifying unit 112 will be described in detail with reference to FIGS. 7A and 7B. Further, the coefficient order controller 113 will be described in detail with reference to FIG. 8.

Figure 5:
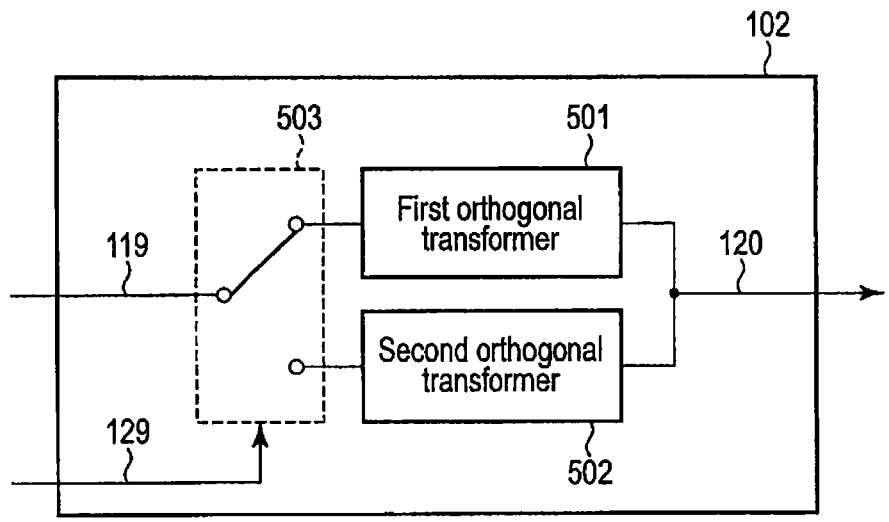
FIG. 5 is a block diagram of an orthogonal transformer according to the first and second embodiments.

The orthogonal transformer 102 in FIG. 5 includes first and second orthogonal transformers 501 and 502 and a basis-selecting switch 503. FIG. 5 is a block diagram of the orthogonal transformer 102 of the moving-picture encoding apparatus.

First, the basis-selecting switch 503 will be described. The basis-selecting switch 503 has the function of selecting the output terminal of the subtractor 101 according to the transformation basis selection information 129 that has been input. If the transformation basis selection information 129 is the first orthogonal transformation, the basis-selecting switch 503 connects the switch to the first orthogonal transformer 501. Conversely, if the transformation basis selection information 129 is the second orthogonal transformation, the basis-selecting switch 503 connects the output terminal to the second orthogonal transformer 502. Examples of the transformation basis selection information 129 are shown in FIG. 7B.

Next, processing performed by the first orthogonal transformer 501 will be described in detail. In intra-prediction used in H.264 for example, since a reference pixel adjacent to a block to be encoded is copied in the direction of prediction, the predictive residual signal 119 thus generated depends on a direction. Since, according to the present embodiment, a direction of prediction is determined for each prediction mode, transformation efficiency can be improved by designing the transformation basis in advance so that coefficient density after an orthogonal transformation of predictive residual occurring for every prediction direction is higher than that before an orthogonal transformation.

For example, the separable two dimensional orthogonal transformation is expressed by the following equation.

$$Y = AXB^T \quad (3)$$

Each of A and $B^T$ represents a transformation matrix, and T represents the transpose of a matrix. X represents an input matrix before a transformation, and Y represents an output matrix after a transformation. If an image signal is a matrix of N×N, each of A and $B^T$ is a transformation matrix of N×N.

Here, in order to perform an orthogonal transformation with accuracy using integers, a transformation matrix may be changed into the form of integers. In this case, an orthogonal transformation is represented by the following equation.

$$Y = (CXD^T) \otimes S \quad (4)$$

In the equation, each of C and $D^T$ is a transformation matrix in the form of integers and S is a normalized matrix used for scaling. In this case, the sign shown below is an equation operator for multiplying the elements of the matrix.

$$\otimes \qquad (5)$$

For instance, a prediction image signal 127 is generated using as a horizontal prediction (mode 1) a block to be coded, and a transformation matrix A is designed using a generated predictive residual signal 119 as an input sample. In this case, the coefficient density when the same input sample is subjected to an orthogonal transformation by use of this transformation matrix is higher than DCT and so on. Using a transformation matrix designed in, for example, a horizontal direction (mode 1), the first orthogonal transformer 501 performs an orthogonal transformation for an input predictive residual signal 119. The predictive residual signal 119 is consequently orthogonally transformed to transformation coefficients 120 by the first orthogonal transformer 501, and this coefficient 120 is input to the quantizer 103. A method using an orthogonal transformation designed in such a way is called an orthogonal transformation where a direction is taken into account.

Next will be described the second orthogonal transformer 502. The second orthogonal transformer 502 performs an orthogonal transformation using, for example, DCT. The predictive residual signal 119 is orthogonally transformed into transformation coefficients 120, and this coefficient 120 is input to the quantizer 103. Alternatively, an orthogonal transformation may be performed using a transformation basis designed using, for example, vertical prediction (mode 0).

The inverse orthogonal transformer 105 includes a first inverse orthogonal transformer 601, a second inverse orthogonal transformer 602, and a basis-selecting switch 603. First, the basis-selecting switch 603 will be described. The basis-selecting switch 603 has the function of selecting the output terminal of the inverse quantizer 104 according to the transformation basis selection information 129 that has been input. If the transformation basis selection information 129 is the first orthogonal transformation, the basis-selecting switch 603 connects its switch to the first orthogonal transformer 601. Conversely, if the transformation basis selection information 129 is the second orthogonal transformation, the basis-selecting switch 603 connects its output terminal to the second orthogonal transformer 602.

Next, processing performed by the first inverse orthogonal transformer 601 will be described in detail. For example, a separable two dimensional inverse orthogonal transformation is represented by the following equation.

$$X=B^T YA \qquad (6)$$

Here, in order to perform an inverse orthogonal transformation with accuracy using integers, a transformation matrix may be changed into the form of integers. In this case, an inverse orthogonal transformation is represented by the following equation:

$$X=(D^T(Y\otimes S)C) \qquad (7)$$

Using the transformation matrix used in the first orthogonal transformer 501 and also using equation (6) or (7), the first inverse orthogonal transformer 601 performs an inverse orthogonal transformation process for an inversely quantized coefficient 122. For example, the inverse orthogonal transformation process is performed with a transformation matrix designed using horizontal prediction (mode 1). The inversely quantized transformation coefficients 122 obtained by the inverse orthogonal transformation is input to the adder 106 in the form of a restored predictive residual signal 123.

Next will be described the second inverse orthogonal transformer 602. Using the transformation matrix used in the second orthogonal transformer 502 and also using equation (6) or (7), the second inverse orthogonal transformer 602 performs an inverse orthogonal transformation process for the inversely quantized coefficient 122. This inverse orthogonal transformation may be, for example, IDCT. Additionally, where using a transformation matrix designed using, for example, vertical prediction (mode 0), the second orthogonal transformer 502 performs an orthogonal transformation, and the same transformation matrix is used in the second inverse orthogonal transformer 602 as well.

Next, the intra-prediction classifying unit 112 will be described. The intra-prediction classifying unit 112 has the function of generating transformation basis selection information 129 used in an orthogonal transformation, based on input prediction mode 128. Specifically, the intra-prediction classifying unit 112 generates the transformation basis selection information 129 based on the prediction mode 128 contained in prediction information 126 output from the prediction selector 110. In this case, using classifying tables shown in FIGS. 7A and 7B, prediction modes are classified into two groups, and the transformation basis selection information 129 expressed by TransformIdx is set for each of the prediction modes classified. FIGS. 7A and 7B show the classifying method employed by the intra-prediction classifying unit 112 of the moving-picture encoding apparatus 100. IntraN× NPredModeIndex shown in the table indicates a prediction mode 128. N is an index indicating a block size such that 4 indicates a 4×4-pixel block; 8, an 8×8-pixel block; and 16, a 16×16-pixel block, and correspondingly for any block size other than these. The description has been given using, as an example, a square block represented by N×N. However, it is easy to extend a block size to a rectangular block represented by M×N.

Where TransformIdx is 0, this indicates use of the first orthogonal and first inverse orthogonal transformations. Where TransformIdx is 1, this indicates the use of the second orthogonal and second inverse orthogonal transformations. In this case, if a pixel block is a rectangular block represented by M×N, M×N may be used as a block size for an orthogonal transformation.

In the present embodiment, TransformIdx is set at 1 only for DC prediction (corresponding to prediction mode 2), and TransformIdx is set at 0 for prediction modes that have other spatial prediction directions.

Next will be described the coefficient order controller 113. The coefficient order controller 113 has a prediction-mode selecting switch 801 and nine types of 2D-1D transformers 802 to 810. The prediction-mode selecting switch 801 connects an output terminal from the quantizer 103 to the 2D-1D transformers according to the mode index number of each prediction mode shown on the left-hand side of FIG. 7A. For instance, if prediction mode 0 is input, the prediction-mode selecting switch 801 connects the output terminal to the vertical 2D-1D transformer 802. The prediction modes correspond one to one to the 2D-1D transformers such that each prediction mode is always connected to the corresponding 2D-1D transformer. The prediction modes correspond one to one to the nine types of 2D-1D transformers 802 to 810 such that an output terminal is selected for each prediction mode.

The nine types of 2D-1D transformers 802 to 810 have the function of transforming into one dimensional data the two dimensional data of quantized transformation coefficients 121 obtained as a result of the quantization process performed by the quantizer 103. For example, in H.264, two dimensional data is transformed into one dimensional data by zigzag scanning.

FIGS. 4A and 4B show an example of transforming two dimensional data with 4×4 blocks into one dimensional data by use of zigzag scan. Specifically, they show an example where quantized transformation coefficients 121 contained in a block of 4×4 size are transformed into one dimensional data by zigzag scanning. If the each component of the quantized transformation coefficients 121 is represented by cij, the 2D-1D transformation using zigzag scanning results as shown in FIG. 4C, in which idx represents the index of the one dimensional data after the 2D-1D transformation.

The nine types of 2D-1D transformers 802 to 810 use different scanning orders according to each of the prediction modes 128. FIG. 9 shows the relation between prediction modes of a 4×4-pixel block and scanning orders. A different scanning order is selected according to the number of IntraN× NPredModeIndex shown in FIG. 7A. The description has been given using, as an example, a 4×4-pixel block. However, similarly, an 8×8-pixel block and 16×16-pixel block can also select scanning orders that differ according to each prediction mode. Where a pixel block is a rectangular block represented by M×N, M×N may be used as a block size for a 2D-1D transformation. In this case, a table of scanning orders for the corresponding prediction modes, as shown in FIG. 9, may be used for the rectangular block. The foregoing description is an outline of the picture-image encoding apparatus 100 according to the present embodiment.

Figure 10A:
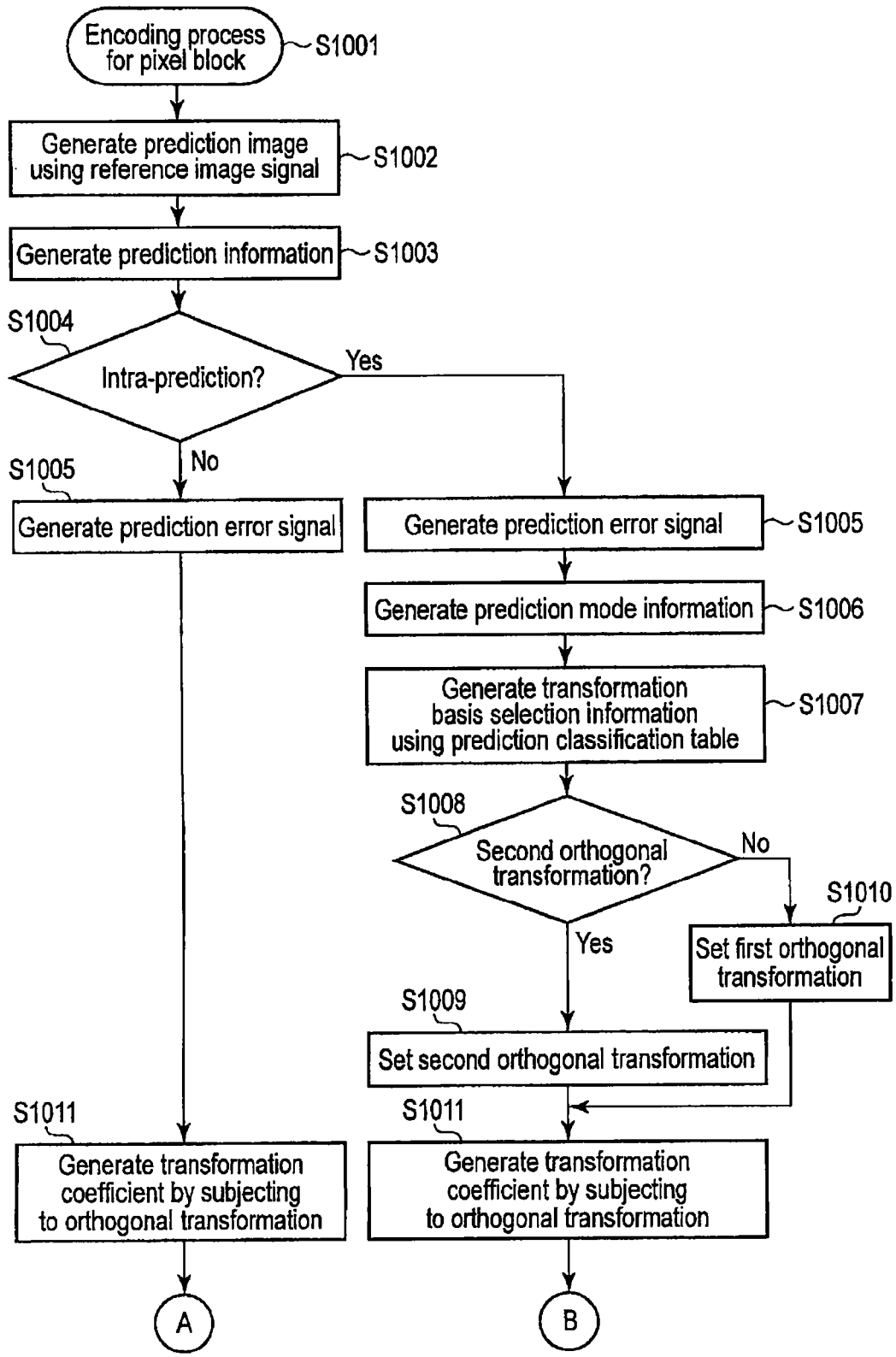
FIG. 10A is a flowchart showing the processing of a block to be encoded according to the first embodiment.

FIGS. 10A and 10B are flowcharts showing processing of a block (macroblock) to be encoded by the moving-picture encoding apparatus 100. In processes shown in FIGS. 10A and 10B, processes with the same index indicate the same process content.

When the input image of a block to be encoded is supplied, an encoding process for a pixel block is initiated (S1001). First, using a reference image signal 125 held in the reference image memory 107, prediction image signals 127 are generated by the intra-prediction image generator 108 and inter-prediction image generator 109 (S1002). According to which prediction-image generator has formed a prediction image, the encoding controller 116 generates the prediction information 126 (including the prediction mode 128) and sets this information in the prediction selector 110. The prediction selector 110 outputs the prediction information 126 to the entropy coder 114 as well as to the prediction-selecting switch 111 (S1003). The prediction-selecting switch 111 determines whether the prediction information 126 is for intra-prediction or not (S1004). If this information is for intra-prediction (YES), the switch 111 connects its output terminal to the intra-prediction image generator 108. If this information is for inter-prediction (NO), the switch 111 connects its output terminal to the inter-prediction image generator 109.

First, a description is given of the case where the prediction information 126 is for intra-prediction. The prediction image signal 127 generated by the intra-prediction image generator 108 is subtracted from the input image signal by the subtractor 101 and generates the predictive residual signal 119 (S1005). Simultaneously, the prediction selector 110 outputs the prediction information 126, set by the encoding controller 116, to the entropy coder 114, and also outputs the prediction mode 128, included in the prediction information 126, to the intra-prediction classifying unit 112 (S1006). In the intra-prediction classifying unit 112, transformation basis selection information 129 is generated from the prediction classification table (FIG. 7A) based on the input prediction mode 128 (S1007). The generated transformation basis selection information 129 is input to the orthogonal transformer 102, and, based on this information, the basis-selecting switch 503 determines where to connect its output terminal (S1008). If this information is YES (TransformIdx is 1), the basis-selecting switch 503 connects its output terminal to the second orthogonal transformer 502 (S1009). If this information is NO (TransformIdx is 0), the basis-selecting switch 503 connects its output terminal to the first orthogonal transformer 501 (S1010).

The predictive residual signal 119 is input to the orthogonal transformer 102, transmitted to the connected output terminal, and subjected to the orthogonal transformation process by the first orthogonal transformer 501 or second orthogonal transformer 502, thereby generating the transformation coefficients 120 (S1011). The transformation coefficients 120 after orthogonal transformation are input to the quantizer 103. The quantizer 103 performs the quantization process, thereby generating quantized transformation coefficients 121 (S1012). The quantized transformation coefficients 121 are input to the coefficient order controller 113. Based on the input prediction mode 128, the coefficient order controller 113 connects the output terminal of the prediction-mode selecting switch 801 to one of the 2D-1D transformers 802 to 810 according to the table in FIG. 7A (S1013).

Using the table shown in FIG. 9, the 2D-1D transformers 802 to 810 perform the 2D-1D transformation process for the corresponding prediction modes, thereby generating a quantized transformation coefficient sequence 117 (S1014). The quantized transformation coefficient sequence 117 is input to the entropy coder 114, subjected to entropy encoding, and then output from the moving-picture encoding apparatus 100 with appropriate timing managed by the encoding controller 116 (S1015). On the other hand, the quantized transformation coefficients 121 are input to the inverse quantizer 104, and subjected to the inverse quantization process, thereby generating the inversely quantized transformation coefficients 122 (S1016).

Based on the transformation basis selection information 129, the inverse orthogonal transformer 105 determines where to connect the output terminal of the basis-selecting switch 603 (S1017). If this information is YES (TransformIdx is 1), the basis-selecting switch 603 connects its output terminal to the second inverse orthogonal transformer 602 (S1018). If this information is NO (TransformIdx is 0), the basis-selecting switch 603 connects its output terminal to the first inverse orthogonal transformer 601 (S1019). The inversely transformed transformation coefficients 122 are input to the inverse orthogonal transformer 105, transmitted through the connected output terminal, and subjected to the inverse orthogonal transformation process by the first inverse orthogonal transformer 601 or second inverse orthogonal transformer 602, thereby generating a restored predictive residual signal 123 (S1020). The restored predictive residual signal 123 is added by the adder 106 to the prediction image signal 127, generated by the intra-prediction image generator 108, then input to the reference image memory 107 in the form of the decoded image signal 124, and stored (S1021). Thus, one pixel block to be encoded is intra-coded by the foregoing processing (S1022).

Next will be described the case where the prediction information 126 is for inter-prediction. The prediction image signal 127 generated by the inter-prediction image generator 109 is subtracted from the input image by the subtractor 101, thereby generating the predictive residual signal 119 (S1005). The predictive residual signal 119 is input to the orthogonal transformer 102. In this case, if the predicting method uses inter-prediction, the basis-selecting switch 503 of the orthogonal transformer 102 always connects its output terminal to the second orthogonal transformer 502. The input predictive residual signal 119 is subjected to an orthogonal transformation (e.g., DCT) by the second orthogonal transformer 502, thereby generating the transformation coefficients 120 (S1011).

The transformation coefficients 120 after an orthogonal transformation are input to the quantizer 103. The quantizer 103 performs the quantizing process, thereby generating the quantized transformation coefficients 121 (S1012). The quantized transformation coefficients 121 are input to the coefficient order controller 113. In the coefficient order controller 113, if the predicting method involves inter-prediction, the output terminal of the prediction-mode selecting switch 801 is always connected to the 2D-1D transformer 804 for DCT. Using zigzag scanning shown in FIG. 4C or the scanning order corresponding to Intra_N×N_DC shown in FIG. 9, the 2D-1D transformer 804 performs a 2D-1D transformation process, thereby generating a quantized transformation coefficient sequence 117 (S1014). The quantized transformation coefficient sequence 117 is input to the entropy coder 114, subjected to entropy encoding, and then output from the moving-picture encoding apparatus 100 with appropriate timing managed by the encoding controller 116 (S1015).

On the other hand, the quantized transformation coefficients 121 are input to the inverse quantizer 104 and subjected to the inverse quantization process, thereby generating the inversely quantized transformation coefficients 122 (S1016). The inversely quantized transformation coefficients 122 are input to the inverse orthogonal transformer 105. In this case, if the predicting method involves inter-prediction, the basis-selecting switch 603 of the inverse orthogonal transformer 105 connects its output terminal to the second inverse orthogonal transformer 602. The inversely transformed transformation coefficients 122 are input to the inverse orthogonal transformer 105, transmitted through the connected output terminal, and subjected to the inverse orthogonal transformation process (e.g., IDCT) by the second inverse orthogonal transformer 602, thereby generating the restored predictive residual signal 123 (S1020). The restored predictive residual signal 123 is added by the adder 106 to the prediction image signal 127 generated by the inter-prediction image generator 109, then input to the reference image memory 107 in the form of a decoded image signal 124, and stored (S1021). Thus, one pixel block to be coded is inter-coded by the foregoing processing (S1022).

The forgoing is a description of the flowchart for processing performed by the moving-picture encoding apparatus 100 according to the present embodiment.

Generally, the orthogonal transformation matrices expressed by the equations (3) and (4) are fixed matrices. Therefore, where the orthogonal transformation matrices are mounted in the form of hardware, they are usually configured by use of hard-wired logic without using a multiplier. For example, it is possible to prepare for an orthogonal transformation in which the direction of prediction is taken into account for each of the nine types of prediction mode defined in H.264. However, since these nine types of prediction mode differ from one another in terms of a set of fixed coefficients, eight types of dedicated hardware have to be configured in addition to the hardware dedicated for DCT required in H.264. As a result, circuit scale increases.

Additionally, since the signal used in the moving-picture coding apparatus is two dimensional image data, this signal is subjected to a two-dimensional orthogonal transformation, as indicated by the equations (3) and (4). In this embodiment, correlation between the vertical and horizontal directions is removed; therefore, where two types of separable orthogonal transformation basis are prepared, sixteen types of one dimensional orthogonal transformation matrix are additionally required, resulting in increased circuit scale in hardware mounting.

In contrast, the present embodiment can be configured to have only two types of orthogonal transformer: one for the first orthogonal transformation in which an intra-prediction direction is taken into account, and the other for the second orthogonal transformation such as DCT. Accordingly, increase in circuit scale can be prevented.

In the case of an orthogonal transformation in which a prediction direction is taken into account, the quantized transformation coefficients 121, obtained by quantizing the transformation coefficients 120 that have been subjected to an orthogonal transformation, tends to generate non-zero transformation coefficients in a block unevenly. This tendency to generate non-zero transformation coefficients differs according to each intra-prediction direction. However, when different images are encoded, the tendencies to generate non-zero transformation coefficients in the same prediction direction have similar properties. In the 2D-1D transformation, entropy encoding is preferentially performed starting with transformation coefficients located where the probability of the generation of a non-zero transformation coefficient is highest. Thus, information required for encoding transformation coefficients can be reduced. Therefore, according to the prediction mode 128 indicating a prediction direction, the probability of the generation of a non-zero transformation coefficient is learned in advance, and nine types of 2D-1D transformation method are determined, thereby decreasing the number of symbols of a transformation coefficient without increasing the amount of calculation in comparison with, for example, H.264.

In addition, as in the present embodiment, where the orthogonal transformer is divided into the two types, i.e., the first orthogonal transformation in which an intra-prediction direction is taken into account and the second orthogonal transformation such as DCT, a prediction direction other than that for the DC prediction is forcibly assigned to the first orthogonal transformation. Therefore, the degree of electrical power concentration is not always high unlike where the zigzag scanning order in H.264 is used. For this reason, the property in which, in each prediction mode, the tendencies to generate non-zero transformation coefficients are similar is utilized such that in the 2D-1D transformation, entropy encoding is preferentially performed starting with a transformation coefficient located where the probability of generation of a non-zero transformation coefficient is highest, thus enabling a decrease in information required for encoding transformation coefficients.

Next will be described a method for designing orthogonal transformation matrices represented by equations (3) and (4). In H.264, nine types of prediction mode are defined for each of a 4×4-pixel block and an 8×8-pixel block and four types of prediction mode are defined for a 16×16-pixel block. A direction transformation matrix is designed such that prediction directions are taken into account for prediction modes other than DC prediction. A plurality of training images are prepared, and a predictive residual signal 119 assumed to be predicted in a corresponding prediction mode is generated. K training vectors are obtained by accumulation for each prediction mode and generated. For example, a training vector for a 4×4-pixel block has K training vectors of 4×4 size. This training vector is subjected to singular value decomposition, thereby generating an orthonormal basis indicating lines and columns.

$$M = U\Sigma V^T \qquad (8)$$

Here, M represents a training vector of N×N size, U represents a unitary matrix that has N lines and N columns, and Σ represents a singular-value matrix in which elements other than the diagonal elements are 0 in N lines and N columns and the diagonal elements are not negative. $V^T$ represents an adjoint matrix (a complex conjugate and transposed matrix) of the unitary matrix that has N lines and N columns. In this case, the pseudo inverse matrix is defined by the following equation.

$$M' = U\Sigma' V^T \qquad (9)$$

M' represents an output vector after an pseudo inverse transformation, Σ' represents the transposition of a matrix that has as its elements the inverses of the diagonal elements. Using a linear least-square method, a matrix U and a matrix V are designed for K training vectors so that square error before and after the orthogonal transformation, indicated by the equations (8) and (9), is smallest. The matrices U and $V^T$ thus designed are used as a transformation matrix in the equation (3). Each of the elements of the designed matrices U and $V^T$ yields a real number. Therefore, when changed into integers, the elements can be used as a transformation matrix in the equation (4). Here, the description has been given using a design example for a 4×4-pixel block. However, transformation matrices for an 8×8- or 16×16-pixel block can also be designed in a similar manner.

Next will be described a method for designing coefficient scanning order as shown in FIG. 9. The coefficient scanning order is designed based on the quantized transformation coefficients 121 generated by the quantizer 103. For instance, in the design of the coefficient scanning order for a 4×4-pixel block, a plurality of training images are prepared, and the predictive residual signals 119 after prediction in the nine types of prediction mode are generated. The predictive residual signals 119 are subjected to an orthogonal transformation expressed by the equation (3) or (4), and the transformation coefficients 120 are quantized. The non-zero transformation coefficients of each of the components of the 4×4-pixel block are accumulated and added for the quantized transformation coefficients 121. This is performed for all the training images, and a histogram of non-zero transformation coefficients is formed for each of the components of the 4×4-pixel block. Based on the histograms, indexes 0 to 15 are assigned to them in ascending order starting with the highest generation frequency. The indexes thus assigned correspond to scanning order in 1D. Coefficient scanning order can be designed by deriving the foregoing indexes for each prediction mode. Here, the description has been given using a design example for a 4×4 pixel block. However, coefficient scanning orders can also be designed for an 8×8- or 16×16-pixel block in a similar manner.

Figures 11, 12:
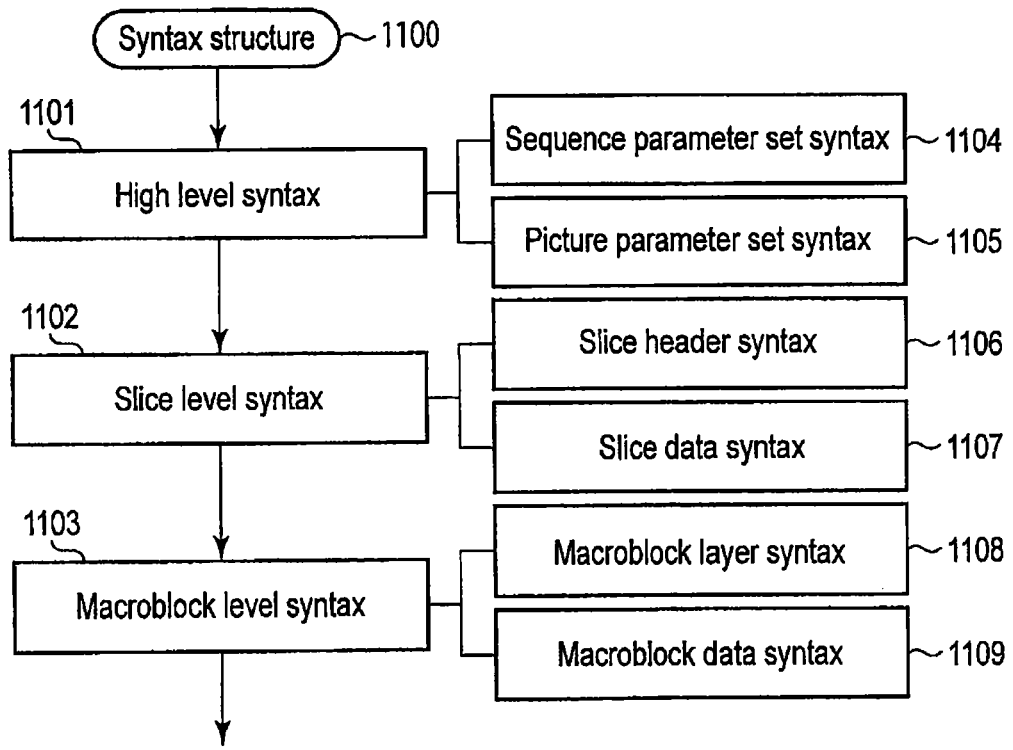
FIG. 11 is a syntax structure according to the first to eighth embodiments.
FIG. 12 is a diagram showing information included in slice header syntax according to the first to eighth embodiments.

Next, a syntax structure in the moving-picture encoding apparatus 100 will be described. FIG. 11 shows the configuration of syntax 1100. The syntax shows the structure of coded data when moving-picture data is encoded. To decode this coded data, syntax is interpreted using a decoding apparatus that has the same syntax configuration. As shown in FIG. 11, the syntax 1100 mainly has three parts. A high level syntax 1101 has syntax information corresponding to a layer higher than a slice that indicates a rectangular area or continuous area contained in a frame or a field. A slice level syntax 1102 has, for each slice, information required for decoding. A macroblock level syntax 1103 has, for each macroblock, information required for decoding.

Each part includes more detailed syntax. The high level syntax 1101 includes syntax of sequence and picture levels, such as a sequence parameter set syntax 1104 and a picture parameter set syntax 1105. The slice level syntax 1102 includes a slice header syntax 1106, a slice data syntax 1107, etc. The macroblock level syntax 1103 includes a macroblock layer syntax 1108, a macroblock prediction syntax 1109, etc.

FIG. 12 shows an example of slice header syntax 1106 according to the present embodiment. slice_uni_directional_transform_flag shown in FIG. 12 is a syntax element indicating whether an orthogonal transformation where a direction is taken into account should be used for the slice. If slice_uni_directional_transform_flag is 0, the orthogonal transformer 102 and inverse orthogonal transformer 105 cannot use the first orthogonal transformer 501 and first inverse orthogonal transformer 601 respectively. In this case, the basis-selecting switch 503 connects its output terminal to the second orthogonal transformer 502 regardless of the transformation basis selection information 129, and also the basis-selecting switch 603 connects its output terminal to the second inverse orthogonal transformer 602 regardless of the transformation basis selection information 129. In this case also, the coefficient order controller 113 can use only the 2D-1D transformer 804 for DCT. In this case, the prediction-mode selecting switch 801 connects its output terminal to the 2D-1D transformer 804 for DCT regardless of the prediction mode 128.

Conversely, if slice_uni_directional_transform_flag is 1, the encoding process is performed following the encoding flowcharts illustrated in FIGS. 10A and 10B. Specifically, the orthogonal transformer 102 selects the first or second orthogonal transformer 501 or 502 according to transformation basis selection information 129, and also the inverse orthogonal transformer 105 selects the first or second inverse orthogonal transformer 601 or 602 according to the transformation basis selection information 129. The prediction mode selecting switch 801 can connect its output terminal to the 2D-1D transformers 802 to 810 according to the prediction mode 128.

FIG. 13 shows an example of macroblock layer syntax 2108 according to another embodiment. mb_uni_directional_transform_flag shown in FIG. 13 is a syntax element indicating whether an orthogonal transformation where a direction is taken into account should be used for the macroblock. mb_type in FIG. 13 indicates the encoding type of the coded micro block. I_N×N indicates that the encoding type is intra-perdition encoding and that the prediction block size is N×N. N includes 32, 64, etc., as well as 4, 8, and 16. mb_uni_directional_transform_flag is coded only when slice_uni_directional_transform_flag is 1 and the encoding type of the macroblock is intra-prediction. If mb_uni_directional_transform_flag is 0, the orthogonal transformer 102 and inverse orthogonal transformer 105 cannot use the first orthogonal transformer 501 and first inverse orthogonal transformer 601 respectively. In this case, the basis-selecting switch 503 connects its output terminal to the second orthogonal transformer 502 regardless of the transformation basis selection information 129, and also the basis-selecting switch 603 connects its output terminal to the second inverse orthogonal transformer 602 regardless of the transformation basis selection information 129. In this case also, the control order controller 113 can use only the 2D-1D transformer 804 for DCT. In this case, the prediction-mode selecting switch 801 connects its output terminal to the 2D-1D transformer 804 for DCT regardless of prediction mode 128.

On the other hand, if mb_uni_directional_transform_flag is 1, the encoding process is performed following the encoding flowcharts illustrated in FIGS. 10A and 10B. Specifically, the orthogonal transformer 102 selects the first or second orthogonal transformer 501 or 502 according to the transformation basis selection information 129, and also the inverse orthogonal transformer 105 selects the first or second inverse orthogonal transformer 601 or 602 according to the transformation basis selection information 129. The prediction mode selecting switch 801 can connects its output terminal to the 2D-1D transformers 802 to 810 according to the prediction mode 128.

Encoding the flag, which indicates whether the orthogonal transformation where a direction is taken into account should be used in a macroblock layer, increases the amount of information relating to transformation selection, but enables the optimum orthogonal transformation for each local area of an image.

A syntax element that is not defined in the present embodiment may be inserted between the lines in the table of syntax shown in each of FIGS. 12 and 13, and description relating to any other conditional branch may be included between them. Additionally, the syntax table may be divided into a plurality of sub-tables or a plurality of syntax tables may be integrated. The same terms do not have to be used but may arbitrarily be changed according to the embodiment employed.

According to the foregoing first embodiment, classifying prediction directions of an intra-prediction mode according to correlations between predictive residuals, and performing an orthogonal transformation or an inverse orthogonal transformation improves coefficient density after an transformation compared to that before an transformation and enables a reduction in hardware mounting circuit scale.

Second Embodiment

Next, a second embodiment will be described. The configuration of a moving-picture encoding apparatus according to the second embodiment is identical to that in the first embodiment except for the internal structure of an intra-prediction image generator 108. Blocks and syntax with the same functions as in the first embodiment are labeled with the same signs and explanations thereof are omitted. Here, the intra-prediction generator 108 is explained with reference to FIG. 14. FIG. 14 is a block diagram of the intra-prediction generator 108. The intra-prediction image generator 108 according to the present embodiment includes a unidirectional intra-prediction image generator 1401, a bi-directional intra-prediction image generator 1402, a prediction-mode generator 1403, and a prediction-selecting switch 1404.

The intra-prediction image generator 108 in the first embodiment has neither bi-directional intra-prediction image generator 1402 nor prediction-selecting switch 1404 shown in FIG. 14. As a description of the processing content of the unidirectional intra-prediction image generator 1401 has been given in the first embodiment with reference to FIGS. 3A to 4C, this description is omitted here.

The bi-directional intra-prediction image generator 1402 generates two unidirectional intra-prediction image signals and subjects them to weighted averaging, thereby generating an image signal 127. Bi-directional prediction using horizontal prediction and orthogonal right downward prediction shown in FIGS. 3C and 3D, for example, will now be described. First, each unidirectional prediction image signal is generated. Here, if horizontal prediction and orthogonal right downward prediction are P1[x, y] and P2[x, y] respectively, a prediction image signal P[x, y] for bi-directional prediction is expressed by the following equation:

$$P[x,y]=(W[x,y]*P1[x,y]+(128-W[x,y])*P2[x,y]+64)>>7 \quad (10)$$

Here, W[x, y] represents a weighted table, and is a matrix with values in the range 0 to 128. FIG. 15 shows the prediction numbers of bi-directional intra-prediction, a combination of two unidirections, and transformation basis information.

In FIG. 15, IntraN×NPredModeIndexL0 indicates the mode number of first unidirectional intra-prediction in bi-directional intra-prediction, and IntraN×NPredModeIndexL1 indicates the mode number of second unidirectional intra-prediction in bi-directional intra-prediction. They are marked L0 and L1, which are prediction modes corresponding to those in FIG. 3A. IntraN×NBiPredModeIndex indicates the mode number of bi-directional intra-prediction. bipred_intra_flag, which will be described below, is a syntax element indicating whether bi-directional intra-prediction should be used.

Next, the function of the prediction mode generator 1403 will be described. Where a prediction image signal by bi-directional intra-prediction is generated by the bi-directional intra-prediction image generator 1402 based on information input from the encoding controller 116, the prediction-mode generator 1403 derives a prediction mode 128 according to the table shown in FIG. 15, and outputs the mode. Specifically, the prediction mode 128 includes bipred_intra_flag, IntraN×NBiPredModeIndex, IntraN×NPredModeIndexL0, and IntraN×NPredModeIndexL1.

The prediction-selecting switch 1404 connects its output terminal to either one of the intra-prediction image generators 1401 and 1402 according to the input prediction mode 128. Here, if bipred_intra_flag is 0, the switch connects its output terminal to the unidirectional intra-prediction image generator 1401. If bipred_intra_flag is 1, the switch connects its output terminal to the bi-directional intra-prediction image generator 1402.

Use of bi-directional prediction expressed by the equation (10) makes it possible to add a linear change in the direction of prediction, compared to simple unidirectional prediction. Generation of a prediction image signal corresponding to a luminance change such as gradation in a natural image enables prediction closer to an input image.

Here, a description has been given of an example where the table is formed so that IntraN×NPredModeIndexL0 is certain to be smaller than IntraN×NPredModeIndexL1. Generally, for numbers assigned to IntraN×NPredModeIndex, a smaller number is assigned to a prediction mode with a higher probability of selection. Therefore, designing TransformIdx according to the prediction mode indicated in the IntraN×NPredModeIndexL0 can improve transfer efficiency. IntraN×NPredModeIndexL0 and IntraN×NPredModeIndexL1 may be exchanged. In this case also, TransformIdx is set according to a smaller number.

The table in FIG. 15 shows an example where eighteen types of combination of bi-directional predictions are added to nine types of unidirectional prediction mode. However, the number of combinations may be increased or decreased, and TransformIdx may be set using the same rule.

The foregoing is a description of the intra-prediction image generator 108 according to the present embodiment.

Next, an intra-prediction classifying unit 112 will be described. The intra-prediction classifying unit 112 has the function of generating, based on the input prediction mode 128, the transformation basis selection information 129, which is used for an orthogonal transformation. That is, the intra-prediction classifying unit 112 generates the transformation basis selection information 129 based on the input prediction mode 128. Here, using the classification tables shown in FIGS. 7A and 15, the prediction modes are classified into two, and the transformation basis selection information 129 expressed by TransformIdx is set for each of the prediction modes classified. In FIG. 15, in the case where, if the intra-prediction mode expressed by IntraN×NPredModeIndexL0 of the two intra-prediction modes is 2 (DC prediction), TransformIdx is set at 1 and TransformIdx corresponding to any direction prediction other than this is set at 0. For example, in the case where the intra-prediction mode expressed by IntraN×NPredModeIndexL1 is 2, TransformIdx may be set at 1, or cases may be classified according to the directions in which prediction image signals are generated based on predictions of corresponding directions. To be more specific, if IntraN×NPredModeIndexL is 0 and IntraN×NPredModeIndexL1 is 1, for example, the angle formed between the two prediction directions is 90 degrees. If, as in such a case, the angle formed by prediction directions is too large, a combination in which TransformIdx is 1 can also be prepared.

Next, a coefficient order controller 113 will be described. TransformIdx is determined by the mode number expressed in IntraN×NPredModeIndexL0 in the input prediction modes 128. IntraN×NPredModeIndexL0 indicates a unidirectional intra-prediction mode and is given nine types of prediction mode.

Here, nine types of 2D-1D transformers 802 to 810 use scanning orders differing according to prediction mode 128. FIG. 9 shows the relation between prediction mode and scanning order in a 4×4-pixel block. According to the number for IntraN×NPredModeIndexL0 in FIG. 15, a different scanning order is selected. Here, a description has been given of an example for a 4×4-pixel block. However, similarly, an 8×8- or 16×16-pixel block can select different scanning orders according to prediction mode. In the case where a pixel block is a rectangular block expressed by M×N, M×N may be used as a block size for a 2D-1D transformation. In this case, a scanning order table as shown in FIG. 9 may be prepared for each prediction mode so as to correspond to a rectangular block.

The foregoing is the outline of the moving-picture encoding apparatus 100 according to the present embodiment.

Next, a syntax structure in the moving-picture encoding apparatus 100 according to the present embodiment will be described. FIG. 16 shows an example of slice header syntax 1106 according to the present embodiment. slice_uni_directional_transform_flag shown in FIG. 16 is a syntax element indicating whether an orthogonal transformation where a direction is taken into account should be used for the slice. As slice_uni_directional_transform_flag is the same as that described in the first embodiment, explanation thereof is omitted.

slice_bipred_intra_flag shown in FIG. 16 is a syntax element indicating whether bi-directional intra-prediction is used for the slice. If the slice_bipred_intra_flag is 0, the intra-prediction image generator 108 cannot use the bi-directional intra-prediction image generator 1402. In this case, the prediction-selecting switch 1404 connects its output terminal to the unidirectional intra-prediction image generator 1401 regardless of prediction mode 128.

Conversely, if slice_bipred_intra_flag is 1, the prediction-selecting switch 1404 in the intra-prediction image generator 108 can select the unidirectional intra-prediction image generator 1401 and the bi-directional intra-prediction image generator 1402 according to the prediction mode 128.

FIG. 17 shows an example of macroblock layer syntax 1108 according to the embodiment. bipred_intra_flag shown in FIG. 17 is a syntax element indicating whether to use bi-directional intra-prediction in the micro block. bipred_intra_flag is encoded only when slice_bipred_intra_flag is 1 and the encoding type of the macroblock is intra-prediction. If bipred_intra_flag is 0, the intra-prediction image generator 108 for the macroblock cannot use the bi-directional intra-prediction image generator 1402. In this case, the prediction-selecting switch 1404 connects its output terminal to the unidirectional intra-prediction image generator 1401 regardless of the prediction mode 128.

Conversely, if bipred_intra_flag is 1, the prediction-selecting switch 1404 in the intra-prediction image generator 108 for this macroblock can select the unidirectional intra-prediction image generator 1401 and the bi-directional intra-prediction image generator 1402 according to the prediction mode 128.

According to the foregoing embodiment, unlike simple unidirectional prediction, use of bi-directional prediction makes it possible to add, in addition to the advantageous effects in the first embodiment, a linear change in the direction of prediction. Generation of a prediction image signal corresponding to a luminance change such as gradation in a natural image enables prediction closer to an input image.

Third Embodiment

Next, a third embodiment will be described. The configuration of a moving-picture coding apparatus according to the third embodiment is identical to that in the first embodiment except for the respective internal structures of an orthogonal transformer 102 and inverse orthogonal transformer 105. Blocks and syntax with the same functions as in the first embodiment are labeled with the same signs and explanations thereof are omitted.

Here, referring to FIGS. 18 and 20, the orthogonal transformer 102 and inverse orthogonal transformer 105 will be explained. FIG. 18 is a block diagram of the orthogonal transformer 102. The orthogonal transformer 102 according to the present embodiment includes a third orthogonal transformer 1801 in addition to the processing blocks shown in FIG. 5. A first orthogonal transformer 501 and a second orthogonal transformer 1802 perform orthogonal transformations where prediction directions as expressed by equations (3) and (4) are taken into account. On the other hand, the third orthogonal transformer 1801 performs, for example, DCT. Transformation basis selection information 129 in this case is shown in FIGS. 19A and 19B. If TransformIdx is 0, a basis-selecting switch 503 connects its output terminal to a first orthogonal transformer 501. If TransformIdx is 1, the basis-selecting switch 503 connects its output terminal to the second orthogonal transformer 1802. If TransformIdx is 2, the basis-selecting switch 503 connects its output terminal to the third orthogonal transformer 1801.

Here, as an example, it is assumed that the orthogonal transformation basis of the first orthogonal transformer 501 is designed for a vertical prediction mode (mode 0 in FIG. 3A) and that the orthogonal transformation basis of the second orthogonal transformer 1802 is designed for a horizontal prediction mode (mode 1 in FIG. 3A). Here, if the vertical prediction mode is used as a first reference direction, TransformIdx is set at 0 for modes 6 and 8, each of which is regarded as a prediction mode the angle of a prediction direction of which is small with respect to the vertical prediction mode. In addition, if the horizontal prediction mode is used as a second reference direction, TransformIdx is set at 1 for modes 5 and 7, each of which is regarded as a prediction mode the angle of a prediction direction of which is small with respect to the horizontal prediction mode. TransformIdx is set at 2 for modes 3 and 4, each of which is regarded as a prediction mode the angle of a prediction direction of which is equal with respect to two reference directions, and is also set for mode 2 (DC prediction), the prediction direction of which cannot be defined.

An intra-prediction classifying unit 112 compares a first angle formed by the prediction direction of intra-prediction mode and the first reference direction (vertical direction), with a second angle formed by the prediction direction of intra-prediction mode and the second reference direction (horizontal direction). If the first angle is not larger than the second angle, the prediction mode is classified into the vertical prediction mode, if the first angle is larger than the second angle, the prediction mode is classified into horizontal prediction mode.

FIG. 20 is a block diagram of the inverse orthogonal transformer 105. The inverse orthogonal transformer 105 according to the present embodiment has a third inverse orthogonal transformer 2001 in addition to the processing blocks shown in FIG. 6. Here, a first inverse orthogonal transformer 601 and a second inverse orthogonal transformer 2002 perform orthogonal transformations where a direction as expressed by equations (6) and (7) is taken into account. On the other hand, the third inverse orthogonal transformer 2001 performs, for example, IDCT. Transformation basis selection information 129 in this case is shown in FIGS. 19A and 19B. If TransformIdx is 0, the basis-selecting switch 603 connects its output terminal to the first inverse orthogonal transformer 601. If TransformIdx is 1, the basis-selecting switch 603 connects its output terminal to the second inverse orthogonal transformer 2002. If TransformIdx is 2, the basis-selecting switch 603 connects its output terminal to the third inverse orthogonal transformer 2001.

The present embodiment uses three orthogonal transformations. Among these, each of the first and second orthogonal transformers performs an orthogonal transformation using an orthogonal transformation basis where a direction is taken into account. As reference directions for prediction mode, the vertical and horizontal prediction modes forming a 90-degree angle between them are provided as reference directions for prediction modes, and a prediction mode that forms an angle of less than 90 degrees with respect to each of these is classified into using the same orthogonal transformation. Classifying an orthogonal transformation by use of correlation in a spatial direction in such a manner enables encoding such that coefficient density is improved in an orthogonal transformation where a direction is taken into account.

In the present embodiment, a description has been given of a system in which switching is performed between the first, second, and third orthogonal transformations and between the first, second, and third inverse orthogonal transformations according to prediction mode classification. However, the number of these can be increased. In this case, hardware and so on may be required for different orthogonal and inverse orthogonal transformations. However, selecting a combination that satisfies the balance between circuit scale and encoding efficiency will suffice.

Additionally, it is possible to provide a configuration for a moving-picture encoding apparatus that is a combination of the second and third embodiments.

In addition to the advantageous effects of the first embodiment, the third embodiment provides, as reference directions for prediction mode, vertical and horizontal prediction modes that together form a 90-degree angle, and classifies a prediction mode forming an angle of less than 90 degrees with respect to each of these as using the same orthogonal transformation. Classifying an orthogonal transformation by use of correlation in a spatial direction in such a manner enables coding such that coefficient density is improved in an orthogonal transformation where a direction is taken into account.

Fourth Embodiment

Next, a fourth embodiment will be described. The configuration of a moving-picture coding apparatus according to the fourth embodiment is identical to that in the first embodiment except for the respective internal structures of an orthogonal transformer 102 and inverse orthogonal transformer 105. Blocks and syntax with the same functions as in the first embodiment are labeled with the same signs and explanations thereof are omitted.

Figure 23:
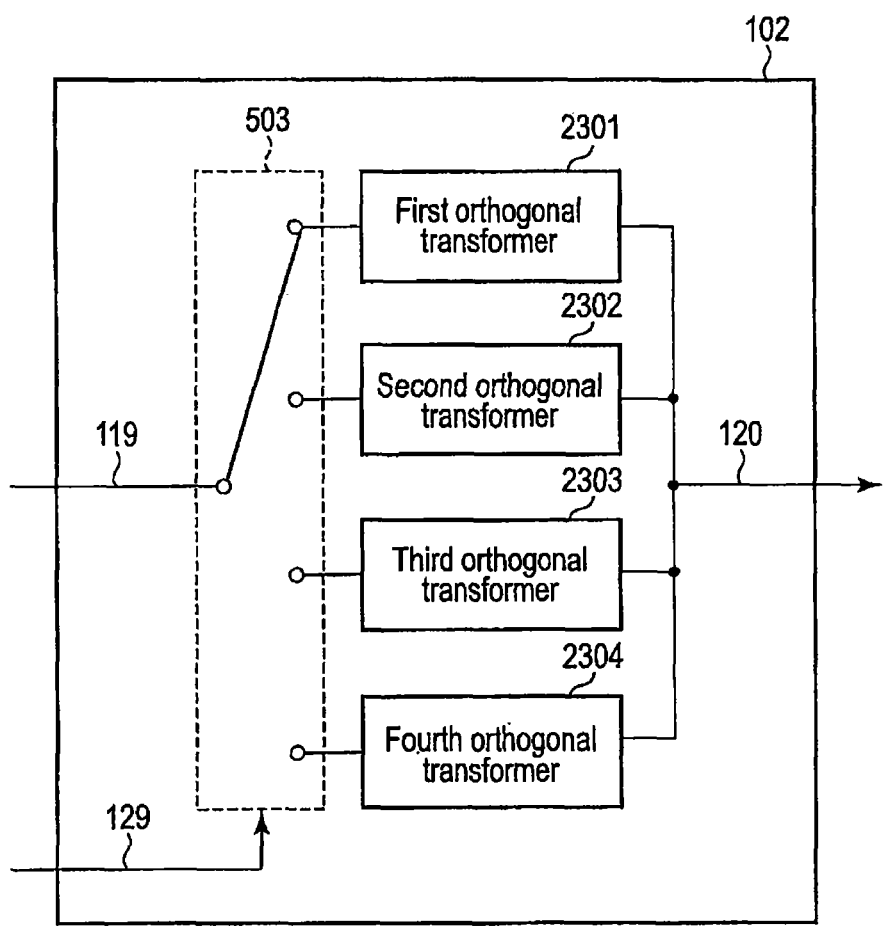
FIG. 23 is a block diagram of an orthogonal transformer according to the fourth embodiment.

Here, referring to FIGS. 23 and 24, the orthogonal transformer 102 and inverse orthogonal transformer 105 will be explained. FIG. 23 is a block diagram of the orthogonal transformer 102. The orthogonal transformer 102 according to the present embodiment includes first and second orthogonal transformers 2301 and 2302 that are altered forms of the processing blocks shown in FIG. 5, and also includes third and fourth orthogonal transformers 2303 and 2304. Here, the first to fourth orthogonal transformers 2301 to 2304 perform orthogonal transformations where predictive residual generated according to a prediction direction, as expressed by equations (3) and (4), is taken into account. One of the first to fourth orthogonal transformers 2301 to 2304 may be replaced with DCT or the like. Transformation basis selection information 129 in this case is shown in FIGS. 25A and 25B. In the table in FIG. 25A, items of the information 129 are classified according to the tendency for a predictive residual generated according to a predicted error. In this case, the prediction modes are classified into four types according to pixel lines referred to in intra-prediction. For example, definitions are made as follows: DC prediction (prediction mode 2), the prediction direction of which cannot be defined, is TransformIdx=3; prediction modes 0, 3, and 7 that use only a vertical reference pixel line are TransformIdx=1; prediction modes 1 and 8 that use only a horizontal reference pixel line are TransformIdx=2; and prediction modes 4, 5, and 6 that use two reference pixel lines, i.e., vertical and horizontal, are TransformIdx=0.

If TransformIdx is 0, a basis-selecting switch 503 connects its output terminal to the first orthogonal transformer 2301. If TransformIdx is 1, the basis-selecting switch 503 connects its output terminal to the second orthogonal transformer 2302. If TransformIdx is 2, the basis-selecting switch 503 connects its output terminal to the third orthogonal transformer 2303. If TransformIdx is 3, the basis-selecting switch 503 connects its output terminal to the fourth orthogonal transformer 2304.

Here, an orthogonal transformation basis for TransformIdx=0 is designed from predictive residual of prediction modes 4, 5, and 6 categorized as the same type, an orthogonal transformation basis for TransformIdx=1 is designed from prediction residual of the prediction modes 0, 3, and 7, an orthogonal transformation basis for TransformIdx=2 is designed from the prediction residual of the prediction modes 1 and 8, and an orthogonal transformation basis for TransformIdx=3 is designed from the prediction residual of the DC prediction (prediction mode 2). Here, a description has been given of an example where the fourth orthogonal transformer 2304 corresponding to TransformIdx=3 performs an orthogonal transformation based on the DCT.

FIG. 24 is a block diagram of the inverse orthogonal transformer 105. The inverse orthogonal transformer 105 according to the present embodiment includes first and second inverse orthogonal transformers 2401 and 2402 that are altered forms of the processing blocks shown in FIG. 6, and also includes third and fourth inverse orthogonal transformers 2403 and 2404. Here, the first to fourth inverse orthogonal transformers 2401 to 2404 perform orthogonal transformations where predictive residual generated according to prediction directions, as expressed by equations (6) and (7), is taken into account. One of the first to fourth inverse orthogonal transformers 2401 to 2404 may be replaced with DCT or the like.

Transformation basis selection information 129 in this case is shown in FIGS. 25A and 25B. If TransformIdx is 0, a basis-selecting switch 603 connects its output terminal to the first inverse orthogonal transformer 2401. If TransformIdx is 1, the basis-selecting switch 603 connects its output terminal to the second inverse orthogonal transformer 2402. If TransformIdx is 2, the basis-selecting switch 603 connects its output terminal to the third inverse orthogonal transformer 2403. If TransformIdx is 3, the basis-selecting switch 603 connects its output terminal to the fourth inverse orthogonal transformer 2404.

The present embodiment uses four orthogonal transformations. Of these, each of the first and fourth orthogonal transformers performs an orthogonal transformation by use of an orthogonal transformation basis in which the correlation between predictive residuals generated according to a prediction direction are taken into account. At this time, classifying orthogonal transformations according to reference pixel lines, along which prediction pixels are formed, enables encoding such that coefficient density is improved in an orthogonal transformation.

In the present embodiment, a description has been given of a system in which switching is performed between the first, second, third and fourth orthogonal transformations and between the first, second, third, and fourth inverse orthogonal transformations according to prediction mode classification. However, the number of these may be decreased or increased. In this case, hardware and so on may be required for different orthogonal and inverse orthogonal transformations. However, selecting a combination that satisfies the balance between circuit scale and encoding efficiency will suffice. Additionally, it is possible to provide a configuration for a moving-picture encoding apparatus that is a combination of the second and fourth embodiments.

In the fourth embodiment, a description was given of a system in which switching is performed between the four types of orthogonal transformation and between the four types of inverse orthogonal transformation according to prediction mode classification. However, sharing an orthogonal transformation matrix in a transformation and in an inverse orthogonal transformation can further reduce circuit scale in the realization of hardware. For example, matrices A and B or matrices C and D in a separable two dimensional transformation expressed by the equations (3) or (4) respectively can be used according to prediction mode. Examples of these are shown in FIGS. 26A, 26B, and 26C, which show a combination of one dimensional transformations corresponding to the matrices A and B in the equation (3), (this is the same for the combination of one dimensional transformations corresponding to the matrices C and D in the equation (4)). For example, if TransformIdx=0, it indicates that common 1D Transform-Matrix $\alpha$ is used for the matrices A and B in the equation (3). Sharing such a transformation matrix enables a reduction in transformation matrices such that the need to prepare for two types of transformation matrix for each orthogonal transformer or each inverse orthogonal transformer is eliminated. For example, since the present embodiment has four types of (inverse) orthogonal transformer, eight types of transformation matrix are required. However, only two types of transformation matrix can suffice for four types of (inverse) transformation. Similarly, sharing is also possible in a reverse transformation as expressed by the equations (6) and (7).

According to the foregoing fourth embodiment, in addition to the advantageous effects in the first embodiment, the use of the four types of orthogonal transformation basis where correlation between predictive residuals generated according to a prediction direction is taken into account enables orthogonal and inverse orthogonal transformations such that circuit scale in the realization of hardware is reduced while coefficient density is further improved.

Additionally, where four types of orthogonal transformation are used by orthogonal transformers taking into account the prediction direction of intra-prediction as in the embodiment, the prediction modes 4, 5, and 6, for example, are forcibly assigned to TransformIdx=0. Accordingly, the degree of concentration of electric power is not always high, unlike where zigzag scanning order in H.264 is used. For this reason, the property such that, in each prediction mode, the tendencies to generate non-zero transformation coefficients are similar is utilized so that in the 2D-1D transformation, entropy encoding is preferentially performed starting with a transformation coefficient located where the probability of generation of a non-zero transformation coefficient is highest, thus enabling a decrease in information required for encoding transformation coefficients.

Next will be described fifth to eighth embodiments according to a moving-picture decoding apparatus.

Fifth Embodiment

Figure 21:
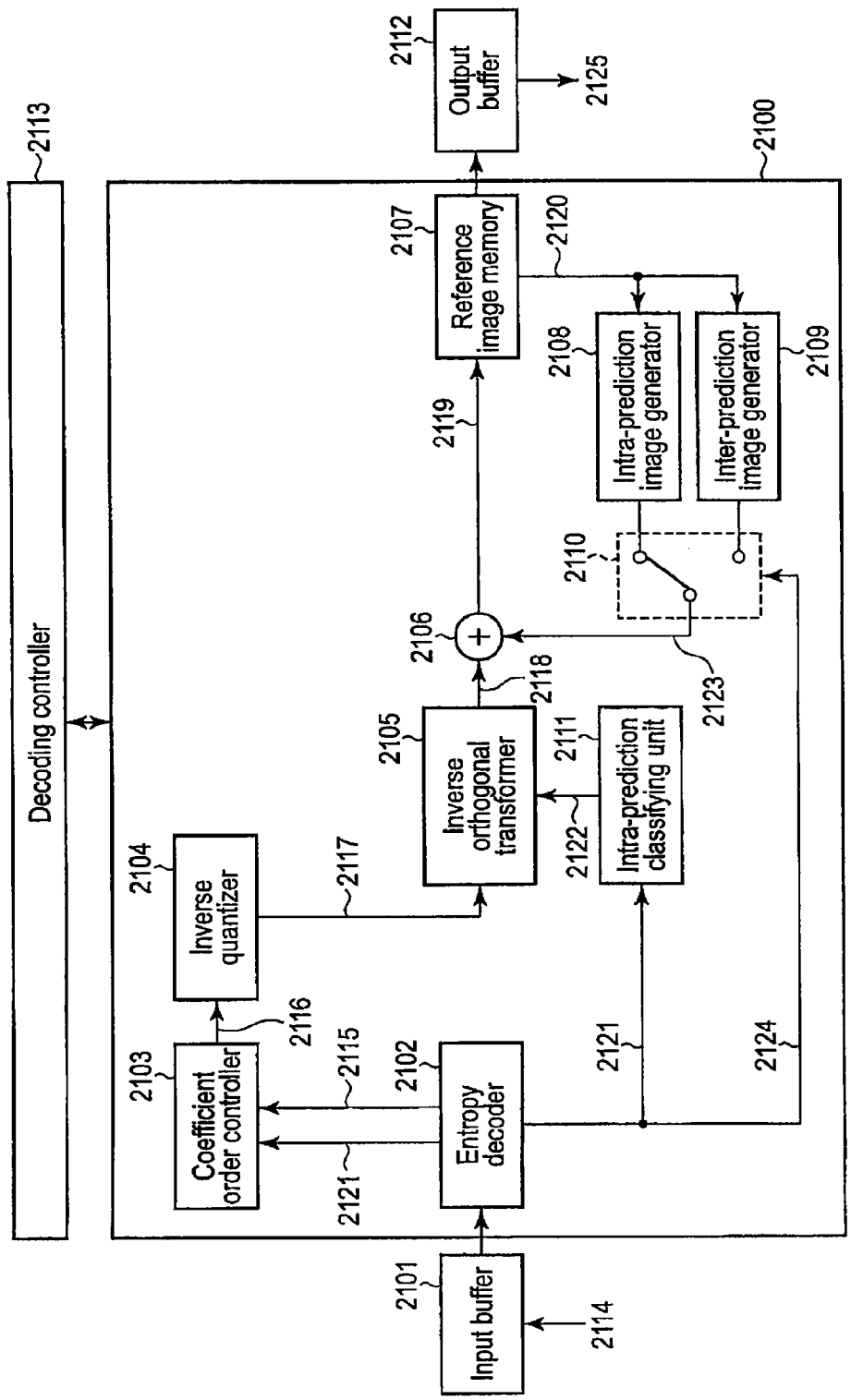
FIG. 21 is a block diagram of a moving-picture decoding apparatus according to the fifth to eighth embodiments.

FIG. 21 shows a moving-picture decoding apparatus according to the fifth embodiment. A moving-picture decoding apparatus 2100 in FIG. 21 decodes coded data generated by the moving-picture encoding apparatus according to, for example, the first embodiment.

The moving-picture decoding apparatus 2100 in FIG. 21 decodes coded data 2114 stored in an input buffer 2101 and outputs a decoded image signal 2119 to an output buffer 2112. The coded data 2114 is transmitted from, for example, a moving-picture encoding apparatus 100, transmitted through an accumulation system or transmission system (not shown), stored once in the input butter 2101 and multiplexed.

The moving-picture decoding apparatus 2100 includes an entropy decoder 2102, a coefficient order controller 2103, an inverse quantizer 2104, an inverse orthogonal transformer 2105, an adder 2106, a reference image memory 2107, an intra-prediction image generator 2108, an inter-prediction image generator 2109, a prediction-selecting switch 2110, and an intra-prediction classifying unit 2111. The moving-picture decoding apparatus 2100 is connected to an input buffer 2101, an output buffer 2112, and a decoding controller 2113.

The entropy decoder 2102 interprets the coded data 2114 by parsing based on the syntax of an each frame or field. The entropy decoder 2102 entropy-decodes the sequences of syntactic symbols of in order, thereby reproducing prediction information 2124, sequence of quantized transformation coefficients 2115, coded parameters of a coded target block, etc. The coded parameters include all parameters required for decoding, such as information about prediction and information about quantization.

The sequence of quantized transformation coefficients 2115 interpreted by the entropy decoder 2102 is input to the coefficient order controller 2103. Also, a prediction mode 2121 included in prediction information 2124 is input to the coefficient order controller 2103. The coefficient order controller 2103 has the function of transforming the sequence of quantized transformation coefficients 2115, which is one dimensional data, into two dimensional data. The sequence of quantized transformation coefficients 2115, transformed by the coefficient order controller 2103, is input to the inverse quantizer 2104 in the form of quantized transformation coefficients 2116. The inverse quantizer 2104 performs inverse quantization based on information about interpreted quantization, thereby decoding transformation coefficients. The quantized transformation coefficients 2116 decoded by the inverse quantizer 2104 are input to the inverse orthogonal transformer 2105 in the form of inversely quantized transformation coefficients 2117. In the inverse orthogonal transformer 2105, the function of which is described below, an inverse discrete cosine transformation (IDCT) for example is performed based on transformation basis selection information 2122 input from the intra-prediction classifying unit 2111.

A decoded predictive residual signal 2118 generated by its being subjected to an inverse orthogonal transformation by the inverse orthogonal transformer 2105 is input to the adder 2106. The adder 2106 adds the decoded predictive residual signal 2118 and a prediction image signal 2123 output from the prediction-selecting switch 2110 (described below), thereby generating a decoded image signal 2119.

The decoded image signal 2119 thus generated is input to a reference image memory 2107. The reference image memory 2107 outputs the input decoded image signal 2119 to the output buffer 2112 and holds the decoded image signal 2119 in its internal memory as a reference image signal 2120, and uses this reference signal 2120 for the process of generating a prediction image signal, which is performed subsequently. The decoded image signal 2119 output from the reference image memory 2107 is output from the moving-picture decoding apparatus 2100, is stored once in the output buffer 2112, and then output at output timing managed by the decoding controller 2113.

The reference image signals 2120 are read from the reference image memory 2107 sequentially for each frame or each field, and are input to the intra-prediction image generator 2108 or the inter-prediction image generator 2109.

The intra-prediction image generator 2108 in FIG. 21 has the same units and function as the intra-prediction image generator 108 in the moving-picture encoding apparatus 100 in FIG. 1. Therefore, explanation of this unit is omitted. The inter-prediction image generator 2109 in FIG. 21 has the same units and function as the inter-prediction image generator 109 shown in FIG. 1. Therefore, explanation of this unit is also omitted.

Next, the coefficient order controller 2103 will be described in detail. FIG. 22 is a block diagram of the coefficient order controller 2103. The coefficient order controller 2103 has a prediction-mode selecting switch 2201 and nine types of 1D-2D transformers 2202 to 2210. The prediction-mode selecting switch 2201 connects its output terminal to the 1D-2D transformers according to the mode number of each prediction mode shown on the left-hand side of FIG. 7A. For instance, if prediction mode 0 is input, the prediction-mode selecting switch 2201 connects the output terminal to the vertical 1D-2D transformer 2202. The prediction modes correspond one to one to the 1D-2D transformers such that each prediction mode is always connected to the corresponding 1D-2D transformer. The prediction modes correspond one to one to the nine types of 1D-2D transformer 2202 to 2210 such that an output terminal is selected for each prediction mode.

The nine types of 1D-2D transformer 2202 to 2210 have the function of transforming into two dimensional data the one dimensional data of the sequence of decoded quantized transformation coefficients 2115. For example, in H.264, one dimensional data is transformed into two dimensional data by zigzag scanning.

FIGS. 4A and 4B show an example of transforming one dimensional data in 4×4 blocks into two dimensional data by use of zigzag scanning. Specifically, they show an example where the series of interpreted quantized transformation coefficients 2115 (corresponding to FIG. 4B) is transformed into two dimensional data (corresponding to FIG. 4A) by inverse zigzag scanning. If each component of the quantized transformation coefficients 2116 is represented by cij, a 1D-2D transformation using an inverse zigzag scanning yields results as shown in FIG. 4C, in which idx represents the index of the one dimensional data before a 1D-2D transformation.

Here, the nine types of 1D-2D transformers 2202 to 2210 use different scanning orders according to each of prediction modes 2121. FIG. 9 shows the relation between prediction modes for a 4×4-pixel block and scanning orders. A different scanning order is selected according to the number of the IntraN×NPredModeIndex shown in FIG. 7A. A description has been given using, as an example, a 4×4-pixel block. However, similarly, an 8×8- or 16×16-pixel block can also select scanning orders that differ according to each prediction mode. Where a pixel block is a rectangular block represented by M×N, M×N may be used as a block size for a 1D-2D transformation. In this case, a table of scanning orders for the corresponding prediction modes, as shown in FIG. 9, may be used for the rectangular block.

Next, the intra-prediction classifying unit 2111 will be described. The intra-prediction classifying unit 2111 has the function of generating transformation basis selection information 2122 used in an inverse orthogonal transformation, based on prediction mode 2121 included in prediction information 2124 interpreted by the entropy decoder 2102. In this case, using classification tables shown in FIGS. 7A and 7B, prediction modes are classified into two groups, and transformation basis selection information 2122 expressed by TransformIdx is set for each of the prediction modes classified. IntraN×NPredModeIndex shown in the table indicates the prediction mode 2121. N is an index indicating a block size such that 4 indicates a 4×4-pixel block; 8, an 8×8-pixel block; and 16, a 16×16-pixel block, and correspondingly for any block size other than these. The description has been given using, as an example, a square block represented by N×N. However, it is easy to extend a block size to a rectangular block represented by M×N.

Where TransformIdx is 0, this indicates use of the first inverse orthogonal transformation. Where TransformIdx is 1, this indicates the use of the second inverse orthogonal transformation. In this case, if a pixel block is a rectangular block represented by M×N, M×N may be used as a block size for an inverse orthogonal transformation.

Here, TransformIdx is set at 1 only for DC prediction (corresponding to prediction mode 2), and TransformIdx is set at 0 for prediction modes that have other spatial prediction directions.

Figure 6:
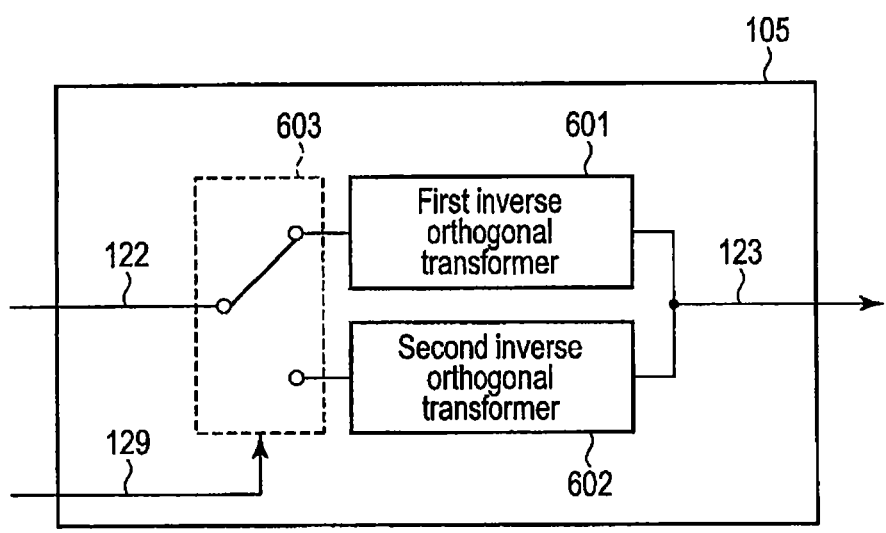
FIG. 6 is a block diagram of inverse orthogonal transformer according to the first, second, fifth and sixth embodiments.

The inverse orthogonal transformer 2105 has the same function as the inverse orthogonal transformer 105 in FIG. 6. Here, the inversely quantized transformation coefficients 122, transformation basis selection information 129, and restored predictive residual signal 123 in FIG. 6 correspond to the inversely quantized transformation coefficients 2117, transformation basis selection information 2122, restored predictive residual signal 2118 in FIG. 21 respectively. As the inverse orthogonal transformers 105 and 2105 shown in FIGS. 6 and 21 respectively have the same function, explanation thereof is omitted here.

Using equation (6) or (7), the first inverse orthogonal transformer of the inverse orthogonal transformer 2105 performs an inverse orthogonal transformation process for inversely quantized transformation coefficients 2117. The inverse orthogonal transformer 2105 performs the inverse orthogonal transformation process using, for example, a transformation matrix designed using horizontal prediction (mode 1). Using the equation (6) or (7), the second inverse orthogonal transformer of the inverse orthogonal transformer 2105 performs an inverse orthogonal transformation process for the inversely quantized transformation coefficients 2117. The inverse orthogonal transformation may be IDCT. In either case, an inverse orthogonal transformation is performed using a transformation matrix corresponding to the orthogonal transformation used in the first embodiment.

The foregoing description is an outline of the moving-picture decoding apparatus 2100 according to the fifth embodiment.

Next, a syntax structure for coded data that the moving-picture decoding apparatus 2100 decodes will be described. The coded data 2114 that the moving-picture decoding apparatus 2100 decodes may have the same syntax structure as that in the moving-picture encoding apparatus 100. Here, it is assumed to use the same syntax as that shown in FIG. 12 or 13, and detailed explanation thereof is omitted.

FIG. 12 shows an example of slice header syntax 1106 according to the present embodiment. slice_uni_directional_transform_flag shown in FIG. 12 is a syntax element indicating whether an orthogonal transformation where a direction is taken into account should be used for the slice. If slice_uni_directional_transform_flag is 0, the orthogonal transformer 102 and inverse orthogonal transformer 105 cannot use the first orthogonal transformer 501 and first inverse orthogonal transformer 601 respectively. In this case, the basis-selecting switch 503 connects its output terminal to the second orthogonal transformer 502 regardless of transformation basis selection information 129, and also the basis-selecting switch 603 connects its output terminal to the second inverse orthogonal transformer 602 regardless of transformation basis selection information 129. In this case also, the coefficient order controller 113 can use only 2D-1D transformer 804 for DCT. In this case, the prediction-mode selecting switch 801 connects its output terminal to the 2D-1D transformer 804 for DCT regardless of prediction mode 128.

Conversely, if the slice_uni_directional_transform_flag is 1, the encoding process is performed following the encoding flowcharts illustrated in FIGS. 10A and 10B. Specifically, the orthogonal transformer 102 selects the first or second orthogonal transformer 501 according to transformation basis selection information 129, and also the inverse orthogonal transformer 105 selects the first or second inverse orthogonal transformer 601 or 602 according to the transformation basis selection information 129. The prediction mode selecting switch 801 can connect its output terminal to the 2D-1D transformers 802 to 810 according to the prediction mode 128.

FIG. 13 shows an example of macroblock layer syntax 1108 according to another embodiment. mb_uni_directional_transform_flag shown in FIG. 13 is a syntax element indicating whether an orthogonal transformation where a direction is taken into account should be used for the macroblock. mb_type in FIG. 13 indicates the encoding type of the coded macroblock. I_N×N indicates that the encoding type is intra-perdition encoding and that the prediction block size is N×N. N includes 32, 64, etc., as well as 4, 8, and 16. mb_uni_directional_transform_flag is coded only when slice_uni_directional_transform_flag is 1 and the encoding type of the macroblock is intra-prediction. If the mb_uni_directional_transform_flag is 0, the orthogonal transformer 102 and the inverse orthogonal transformer 105 cannot use the first orthogonal transformer 501 and the first inverse orthogonal transformer 601 respectively. In this case, the basis-selecting switch 503 connects its output terminal to the second orthogonal transformer 502 regardless of the transformation basis selection information 129, and also the basis-selecting switch 603 connects its output terminal to the second inverse orthogonal transformer 602 regardless of the transformation basis selection information 129. In this case also, the control order controller 113 can use only the 2D-1D transformer 804 for DCT. In this case, the prediction-mode selecting switch 801 connects its output terminal to the 2D-1D transformer 804 for DCT regardless of the prediction mode 128.

On the other hand, if mb_uni_directional_transform_flag is 1, the encoding process is performed following the encoding flowcharts illustrated in FIGS. 10A and 10B. Specifically, the orthogonal transformer 102 selects the first or second orthogonal transformer 501 or 502 according to the transformation basis selection information 129, and also the inverse orthogonal transformer 105 selects the first or second inverse orthogonal transformer 601 or 602 according to the transformation basis selection information 129. The prediction mode selecting switch 801 can connect its output terminal to the 2D-1D transformers 802 to 810 according to the prediction mode 128.

Encoding the flag, which indicates whether the orthogonal transformation where a direction is taken into account should be used in a macroblock layer, increases the amount of information relating to transformation selection, but enables the optimum orthogonal transformation for each local area of an image.

A syntax element that is not defined in the present embodiment may be inserted between the lines in the table of syntax shown in each of FIGS. 12 and 13, and description relating to any other conditional branch may be included between them. Additionally, the syntax table may be divided into a plurality of sub-tables or a plurality of syntax tables may be integrated. The same terms do not have to be used but may arbitrarily be changed according to the embodiment employed.

According to the foregoing fifth embodiment, classifying prediction directions of an intra-prediction mode according to correlations between predictive residuals, and performing an inverse orthogonal transformation improves coefficient density after a transformation and enables a reduction in hardware mounting circuit scale.

Sixth Embodiment

Next, a sixth embodiment will be described. The configuration of a moving-picture decoding apparatus according to the sixth embodiment is identical to that in the fifth embodiment. A moving-picture decoding apparatus 2100 according to the sixth embodiment decodes coded data generated by the moving-picture encoding apparatus according to the second embodiment. Blocks and syntax with the same functions as in the fifth embodiment are labeled with the same signs and explanations thereof are omitted. The sixth embodiment is different from the fifth embodiment only in the internal structure of an intra-prediction image generator 2108.

Here, the intra-prediction generator 2108 is explained with reference to FIG. 14. FIG. 14 is a block diagram of the intra-prediction generator 2108(108). The prediction mode 128, prediction image signal 127, and reference image signal 125 in FIG. 14 correspond to the prediction mode 2121, prediction image signal 2123, and reference image signal 2120 in FIG. 21 respectively.

The intra-prediction image generator 2108 (108) according to the present embodiment includes a unidirectional intra-prediction image generator 1401, a bi-directional intra-prediction image generator 1402, a prediction-mode generator 1403, and a prediction-selecting switch 1404.

The intra-prediction image generator 108 in the first embodiment has neither the bi-directional intra-prediction image generator 1402 nor the prediction-selecting switch 1404 shown in FIG. 14. As a description of the processing content of the unidirectional intra-prediction image generator 1401 has been given in the first embodiment with reference to FIGS. 3A to 4C, this description is omitted here.

The bi-directional intra-prediction image generator 1402 generates two unidirectional intra-prediction image signals and subjects them to weighted averaging, thereby generating an image signal 127. Bi-directional prediction using horizontal prediction and orthogonal right downward prediction shown in FIGS. 3C and 3D, for example, will now be described. First, each unidirectional prediction image signal is generated. Here, if horizontal prediction and orthogonal right downward prediction are P1[x, y] and P2[x, y] respectively, a prediction image signal P[x, y] for bi-directional prediction is expressed by the equation (10). FIG. 15 shows the prediction numbers for bi-directional intra-predictions, a combination of two uni-directions, and transformation basis information.

Next, the function of the prediction mode generator 1403 will be described. Prediction information 2124 interpreted by an entropy decoder 2102 is held in and controlled by a decoding controller 2113. Here, where bi-directional intra-prediction is selected as prediction information included in the prediction information 2124, the prediction-mode generator 1403 derives the prediction mode 2121 in bi-directional intra-prediction according to the table shown in FIG. 15, and outputs the mode. The prediction-selecting switch 1404 connects its output terminal to the intra-prediction image generators 1401 and 1402 according to the input prediction mode 2121. Here, if bipred_intra_flag is 0, the switch connects its output terminal to the unidirectional intra-prediction image generator 1401. If bipred_intra_flag is 1, the switch connects its output terminal to the bi-directional intra-prediction image generator 1402.

The foregoing is a description of the intra-prediction image generator 2108 (108) according to the present embodiment.

Next will be described the intra-prediction classifying unit 2111. The intra-prediction classifying unit 2111 in FIG. 21 has the same function as the intra-prediction classifying unit 112 according to the second embodiment. The intra-prediction classifying unit 2111 has the function of generating, based on input prediction mode 2121, transformation basis selection information 2122, which is used for an inverse orthogonal transformation. That is, the intra-prediction classifying unit 2111 generates transformation basis selection information 2122 based on prediction mode 2121 input from the intra-prediction image generator 2108. Here, using the classification tables shown in FIGS. 7A and 15, the prediction modes are classified into two, and transformation basis selection information 129 expressed by TransformIdx is set for each of the prediction modes classified.

Next, a coefficient order controller 2103 will be described. TransformIdx is determined by the mode number expressed in IntraNxNPredModeIndexL0. IntraNxNPredModeIndexL0 indicates a unidirectional intra-prediction mode and is given nine types of prediction modes.

Here, nine types of 1D-2D transformers 2202 to 2210 use scanning orders differing according to a prediction mode 2121. FIG. 9 shows the relation between a prediction mode and a scanning order in a 4×4-pixel block. According to the number for IntraNxNPredModeIndexL0 in FIG. 15, a different scanning order is selected. Here, a description has been given of an example for a 4×4-pixel block. However, similarly, an 8×8- or 16×16-pixel block can select different scanning orders according to a prediction mode. In the case where a pixel block is a rectangular block expressed by M×N, M×N may be used as a block size for a 2D-1D transformation. In this case, a scanning order table as shown in FIG. 9 may be prepared for each prediction mode so as to correspond to a rectangular block.

FIG. 16 shows an example of slice header syntax 1106 according to the present embodiment. slice_uni_directional_transform_flag shown in FIG. 16 is a syntax element indicating whether an orthogonal transformation where a direction is taken into account should be used for the slice. As slice_uni_directional_transform_flag is the same as that described in the first embodiment, explanation thereof is omitted.

slice_bipred_intra_flag shown in FIG. 16 is a syntax element indicating whether bidirectional intra-prediction is used for the slice. If slice_bipred_intra_flag is 0, the intra-prediction image generator 108 cannot use the bi-directional intra-prediction image generator 1402. In this case, the prediction-selecting switch 1404 connects its output terminal to the unidirectional intra-prediction image generator 1401 regardless of the prediction mode 128.

Conversely, if slice_bipred_intra_flag is 1, the prediction-selecting switch 1404 in the intra-prediction image generator 108 can select unidirectional intra-prediction image generator 1401 and bi-directional intra-prediction image generator 1402 according to the prediction mode 128.

FIG. 17 shows an example of macroblock layer syntax 1108 according to the embodiment. bipred_intra_flag shown in FIG. 17 is a syntax element indicating whether to use bi-directional intra-prediction in the macroblock. bipred_intra_flag is encoded only when slice_bipred_intra_flag is 1 and the encoding type of the macroblock is intra-prediction. If bipred_intra_flag is 0, the intra-prediction image generator 108 for the macroblock cannot use the bi-directional intra-prediction image generator 1402. In this case, the prediction-selecting switch 1404 connects its output terminal to the unidirectional intra-prediction image generator 1401 regardless of the prediction mode 128.

Conversely, if bipred_intra_flag is 1, the prediction-selecting switch 1404 in the intra-prediction image generator 108 for this macroblock can select the unidirectional intra-prediction image generator 1401 and the bi-directional intra-prediction image generator 1402 according to the prediction mode 128.

The foregoing sixth embodiment can decode coded data generated by the moving-picture encoding apparatus according to the second embodiment, in addition to the advantageous effects of the fifth embodiment.

Seventh Embodiment

Next, a seventh embodiment will be described. The configuration of a moving-picture decoding apparatus according to the seventh embodiment is identical to that in the fifth embodiment. A moving-picture decoding apparatus 2100 according to the seventh embodiment decodes coded data generated by the moving-picture encoding apparatus according to the third embodiment. Blocks and syntax with the same functions as in the fifth embodiment are labeled with the same signs and explanations thereof are omitted. The seventh embodiment differs from the fifth embodiment only in the internal configuration of an inverse orthogonal transformer 2105.

Here, referring to FIG. 20, the orthogonal transformer 2105 will be explained. The inverse orthogonal transformer 105 in FIG. 20 has the same function as the inverse orthogonal transformer 2105 in FIG. 21. The inversely-quantized transformation coefficients 122, transformation basis-selecting information 129, and restored predictive residual signal 123 in FIG. 20 correspond to inversely-quantized transformation coefficients 2117, transformation basis-selecting information 2122, and restored predictive residual signal 2118 in FIG. 21 respectively.

FIG. 20 is a block diagram of the orthogonal transformer 2105(105). The orthogonal transformer 2105(105) according to the present embodiment includes a third orthogonal transformer 2001 in addition to the processing blocks shown in FIG. 6. The first inverse orthogonal transformer 601 and the second inverse orthogonal transformer 602 perform inverse orthogonal transformations where a prediction direction as expressed by equations (6) and (7) is taken into account. On the other hand, the third inverse orthogonal transformer 2001 performs, for example, IDCT. The transformation basis selection information 2122 in this case is shown in FIGS. 19A and 19B. If TransformIdx is 0, a basis-selecting switch 603 connects its output terminal to the first inverse orthogonal transformer 601. If TransformIdx is 1, the basis-selecting switch 603 connects its output terminal to the second inverse orthogonal transformer 602. If TransformIdx is 2, the basis-selecting switch 603 connects its output terminal to the third orthogonal transformer 2001.

Incidentally, it is possible to provide a configuration for a moving-picture decoding apparatus that is a combination of the sixth and seventh embodiments.

The foregoing seventh embodiment can decode coded data generated by the moving-picture encoding apparatus according to the third embodiment, in addition to the advantageous effects of the fifth embodiment.

Eighth Embodiment

Next, an eighth embodiment will be described. The configuration of a moving-picture decoding apparatus according to the eighth embodiment is identical to that in the fifth embodiment. A moving-picture decoding apparatus 2100 according to the eighth embodiment decodes coded data generated by the moving-picture encoding apparatus according to the fourth embodiment. Blocks and syntax with the same functions as in the fifth embodiment are labeled with the same signs and explanations thereof are omitted. The eighth embodiment differs from the fifth embodiment only in the internal configuration of an inverse orthogonal transformer 2105.

Here, referring to FIG. 24, the orthogonal transformer 2105 will be explained. The inverse orthogonal transformer 105 in FIG. 24 has the same function as the inverse orthogonal transformer 2105 in FIG. 21. The inversely-quantized transformation coefficients 122, transformation basis-selecting information 129, and restored predictive residual signal 123 in FIG. 20 correspond to inversely-quantized transformation coefficients 2117, transformation basis-selecting information 2122, and restored predictive residual signal 2118 in FIG. 21 respectively.

FIG. 24 is a block diagram of the inverse orthogonal transformer 2105(105). The inverse orthogonal transformer 2105(105) according to the present embodiment includes the first and second inverse orthogonal transformers 2401 and 2402, which are altered forms of the processing blocks shown in FIG. 6, and also includes third and fourth inverse orthogonal transformers 2403 and 2404. Here, the first to fourth inverse orthogonal transformers 2401 to 2404 perform inverse orthogonal transformations where predictive residual generated according to a prediction direction, as expressed by equations (6) and (7), is taken into account. One of the first to fourth inverse orthogonal transformers 2401 to 2404 may be replaced with IDCT or the like.

The transformation basis selection information 129 in this case is shown in FIGS. 25A and 25B. If TransformIdx is 0, a basis-selecting switch 603 connects its output terminal to the first inverse orthogonal transformer 2401. If TransformIdx is 1, the basis-selecting switch 603 connects its output terminal to the second inverse orthogonal transformer 2402. If TransformIdx is 2, the basis-selecting switch 603 connects its output terminal to the third inverse orthogonal transformer 2403. If TransformIdx is 3, the basis-selecting switch 603 connects its output terminal to the fourth inverse orthogonal transformer 2404.

The present embodiment uses four inverse orthogonal transformations. With regard to these, each of the first and fourth inverse orthogonal transformers performs an inverse orthogonal transformation by use of an orthogonal transformation basis in which the correlation between predictive residuals generated according to a prediction direction is taken into account. At this time, classifying inverse orthogonal transformations according to reference pixel lines, along which prediction pixels are formed, enables encoding such that coefficient density is high.

In the present embodiment, a description has been given of a system in which switching is performed between the first, second, third and fourth orthogonal transformations and between the first, second, third, and fourth inverse orthogonal transformations according to prediction mode classification. However, the number of these may be increased. In this case, hardware and so on may be required for different inverse orthogonal transformations. However, selecting a combination that satisfies the balance between circuit scale and encoding efficiency will suffice. Additionally, it is possible to provide a configuration for a moving-picture decoding apparatus that is a combination of the sixth and eighth embodiments.

In the eighth embodiment, a description was given of a system in which switching is performed between the four types of inverse orthogonal transformations according to prediction mode classification. However, sharing an orthogonal transformation matrix in an inverse orthogonal transformation can further reduce circuit scale in the realization of hardware. For example, matrices A and B or matrices C and D in a separable two dimensional inverse orthogonal transformation expressed by the equations (6) or (7) respectively can be used according to prediction mode. Examples of these are shown in FIGS. 26A, 26B, and 26C, which show a combination of one dimensional transformations corresponding to the matrices A and B in the equation (6), (this is the same for the combination of one dimensional transformations corresponding to the matrices C and D in the equation (7)). For example, if TransformIdx=0, it indicates that common 1D Transform-Matrix α is used for the matrices A and B in the equations (6). Sharing such a transformation matrix enables a reduction in transformation matrices such that the need to prepare for two types of transformation matrix for each inverse orthogonal transformer is eliminated. For example, since the present embodiment has four types of inverse orthogonal transformer, eight types of transformation matrix are required. However, only two types of transformation matrix can suffice for four types of inverse orthogonal transformation.

The forgoing eighth embodiment can decode coded data generated by the moving-picture encoding apparatus according to the fourth embodiment, in addition to the advantageous effects of the fifth embodiment.

Modified Examples of the First to Eighth Embodiments (1) A syntax element that is not defined in the present embodiment may be inserted between the lines in the table of syntax shown in each of FIGS. 12, 13, 16, and 17 and description relating to any other conditional branch may be included between them. Additionally, the syntax table may be divided into a plurality of sub-tables or a plurality of syntax tables may be integrated. The same terms do not have to be used but may arbitrarily be changed according to the embodiment employed.

(2) In each of the first to eighth embodiments, a description has been given of the case where a frame to be processed is divided into square blocks of 16×16-pixel size, for example, and these blocks are encoded/decoded in order from the left top block of a picture toward the right bottom one, as shown in FIG. 2A. However, encoding and decoding orders are not limited thereto but encoding and decoding orders may start from the right bottom toward the left top or may lead out from the center of a picture in a spiral. Further, encoding and decoding orders may start from the right top toward the left bottom or may start from the perimeter of a picture toward its center.

(3) In the first to eighth embodiments, a description has been given of cases where block sizes are a 4×4-, 8×8-, or 16×16-pixel block. However, a block to be estimated does not have to be square but may have any block size such as a 16×8-, 8×16-, 8×4-, or 4×8-pixel block. Additionally, even a macroblock does not have to be formed of smaller blocks of equal size but may be composed of smaller blocks of different sizes. In this case, as the number of divisions increases, the number of symbols for encoding or decoding the division information increases. In this case, a block size may be selected taking account of the balance between the number of symbols for transformation coefficients and the local decoded image.

(4) In each of the first to eighth embodiments, a description has been given using an example where neither a luminance signal nor a color-difference signal is divided but only the color signal component of one of these is divided. However, where a prediction process differs between the luminance signal and the color difference signal, they may use their respective prediction methods or may use the same prediction method. If different prediction methods are used, a prediction method selected for the color-difference signal is encoded or decoded in the same manner as for the luminance signal.

(5) In each of the first to eighth embodiments, a description has been given using an example where neither a luminance signal nor a color-difference signal is divided but only the color signal component of one of these is divided. However, where an orthogonal transformation process differs between the luminance signal and the color difference signal, they may use their respective orthogonal transformation methods or may use the same orthogonal transformation method. If different orthogonal transformation methods are used, an orthogonal transformation method selected for the color-difference signal is encoded or decoded in the same manner as for the luminance signal.

The foregoing embodiments not only increase coefficient density after an orthogonal transformation in intra-prediction encoding but also reduce circuit scale in hardware mounting. That is, the foregoing embodiments yield the advantageous effects that where an orthogonal transformation is realized with hardware, significant increase in circuit scale due to use of dedicated hardware corresponding to each prediction direction is obviated and increasing coefficient density after an orthogonal transformation improves encoding efficiency and also subjective image-quality.

Instructions given in the processing procedures in the foregoing embodiments can be performed based on software programs. A general-purpose computing system may pre-store the programs and read the programs, thereby obtaining the same effects as those yielded by the moving-picture encoding and decoding apparatuses according to the foregoing embodiments. The instructions described in the foregoing embodiments are recorded, as programs that can be executed by computers, on a magnetic disk (such as a flexible disk or hardware), an optical disk (such as CD-ROM, CD-R, CD-RW, DVD-ROM, DVD±R, or DVD±RW), a semiconductor memory, or a recording media similar to these. A recording media readable by a computer or built-in system may be of any storage type. A computer may read the programs from such a recording media and cause a CPU to perform instructions, described in the programs, based on the program, thereby realizing operations just as do the moving-picture encoding and decoding apparatuses described above. Needless to say, where a computer obtains the programs, these may be obtained or read through a network.

Alternatively, some of the processing for realizing each of the present embodiments may be performed by MW (middleware), such as an OS (Operating System), network, or data base management software; or, which is operating on a computer based on instructions for each program installed in the computer or built-in system from a recording media.

Furthermore, the recording media in the present embodiments is not limited to one independent computer or built-in system but may also be a recording medium obtained by downloading a program, transmitted by a LAN, the internet, or the like, and storing (or temporarily storing) it.

Alternatively, the recording media are not limited to only one. However, where the present embodiments are performed by a plurality of media, these media are included as recording media of the present embodiments and may have any configuration.

A computer or built-in system in the present embodiments is used for performing each processing in the present embodiments based on the corresponding program stored in a recording medium and may have any configuration, as of a single apparatus such as a personal computer or microcomputer or as of a system in which a plurality of apparatuses are networked.

Examples of a computer for the present embodiments include not only a personal computer but also a processor included in an information processing unit, a microcomputer, and so on. They refer to any apparatus or device able to realize the function of the present embodiments according to the programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A moving-picture decoding apparatus, comprising:
an entropy decoder configured to obtain transformation coefficients from coded data obtained by coding processes according to prediction directions;
an order controller configured to rearrange the transformation coefficients according to a scanning order corresponding to a prediction direction of a target block from among scanning orders predetermined for the prediction directions;
a classifying unit configured to classify a mode applied to the target block into a predetermined first mode or a predetermined second mode;
a first inverse orthogonal transformer configured to obtain a predictive residual signal by subjecting the rearranged transformation coefficients to an inverse orthogonal transformation by use of a first transformation basis common to the prediction directions if the applied mode is classified into the first mode;
a second inverse orthogonal transformer configured to obtain a predictive residual signal by subjecting the rearranged transformation coefficients to the inverse orthogonal transformation by use of one type of second transformation basis different from the first transformation basis if the applied mode is classified into the second mode; and
a generator configured to generate a decoded image signal by use of the predictive residual signal,
wherein the first transformation basis includes a third transformation basis, and the first inverse orthogonal transformer uses the third transformation basis in transformations of both horizontal and vertical directions.

2. A moving-picture decoding method, comprising:
obtaining transformation coefficients from coded data obtained by coding processes according to prediction directions;
rearranging the transformation coefficients according to a scanning order corresponding to a prediction direction of a target block from among scanning orders predetermined for the prediction directions;
classifying a mode applied to the target block into a predetermined first mode or a predetermined second mode;
obtaining a predictive residual signal by subjecting the rearranged transformation coefficients to an inverse orthogonal transformation by use of a first transformation basis common to the prediction directions if the applied mode is classified into the first mode;
obtaining a predictive residual signal by subjecting the rearranged transformation coefficients to the inverse orthogonal transformation by use of a second transformation basis different from the first transformation basis if the applied mode is classified into the second mode; and
generating a decoded image signal by use of the predictive residual signal,
wherein the first transformation basis includes a third transformation basis, and the first inverse orthogonal transformer uses the third transformation basis in transformations of both horizontal and vertical directions.

* * * * *